(12) United States Patent
Yoshida et al.

(10) Patent No.: US 8,115,812 B2
(45) Date of Patent: Feb. 14, 2012

(54) MONITORING SYSTEM, CAMERA, AND VIDEO ENCODING METHOD

(75) Inventors: Atsushi Yoshida, Osaka (JP); Takao Yamaguchi, Osaka (JP); Katsuji Aoki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1009 days.

(21) Appl. No.: 11/997,473

(22) PCT Filed: Sep. 20, 2007

(86) PCT No.: PCT/JP2007/068306
§ 371 (c)(1),
(2), (4) Date: Jan. 31, 2008

(87) PCT Pub. No.: WO2008/035745
PCT Pub. Date: Mar. 27, 2008

(65) Prior Publication Data
US 2010/0097470 A1 Apr. 22, 2010

(30) Foreign Application Priority Data
Sep. 20, 2006 (JP) ................... 2006-254313

(51) Int. Cl.
*H04N 7/18* (2006.01)
(52) U.S. Cl. ........ 348/159; 348/143; 348/149; 348/152; 348/154; 348/169; 375/240.1; 382/103
(58) Field of Classification Search .......... 348/143, 348/149, 152, 154, 159, 169; 375/240.1; 382/103
See application file for complete search history.

(56) References Cited

U.S. PATENT DOCUMENTS
6,292,098 B1 9/2001 Ebata et al.
7,212,228 B2* 5/2007 Utsumi et ................ 348/139
7,242,423 B2* 7/2007 Lin ........................... 348/169
(Continued)

FOREIGN PATENT DOCUMENTS
EP 1 713 275 10/2006
(Continued)

OTHER PUBLICATIONS
Nakazawa Atsushi et al., "Tracking multiple persons using multiple seeing agents", Institute of Electronics, Information and Communication Engineers, 2000, pp. 399-400.
(Continued)

*Primary Examiner* — Glenton B Burgess
*Assistant Examiner* — Oleg Survillo
(74) *Attorney, Agent, or Firm* — Wenderoth, Lind & Ponack, L.L.P.

(57) ABSTRACT

The present invention provides a monitoring system enabling efficient determination of code amounts for respective cameras according to the movement of an object. Each camera (101) making up the monitoring system includes: a collaboration parameter updating unit (413) which updates a collaboration parameter, based on the position of the object detected by a sensor (106) and position identification information and collaboration parameter of a neighboring camera stored in a neighboring camera information storage unit (405), so that (i) a distribution pattern indicating the distribution of the collaboration parameter value in a space where plural cameras are present forms a concentric circle with the object being the origin, and (ii) the target code amount for a camera capturing the object becomes larger than that of a camera not capturing the object; and a target code amount determining unit (410) which determines the target code amount assigned to the camera based on the updated collaboration parameter, and the collaboration parameter and the target code amount for the neighboring camera stored in the neighboring camera information storage unit (405).

17 Claims, 24 Drawing Sheets

U.S. PATENT DOCUMENTS

| | | | |
|---|---|---|---|
| 7,283,161 B2 | 10/2007 | Someya et al. | |
| 7,429,918 B2* | 9/2008 | Watanabe | 340/468 |
| 7,526,102 B2* | 4/2009 | Ozer | 382/103 |
| 7,787,013 B2* | 8/2010 | Yoshida et al. | 348/159 |
| 7,836,200 B2* | 11/2010 | Ishii et al. | 709/233 |
| 2002/0047901 A1* | 4/2002 | Nobori et al. | 348/149 |
| 2005/0012817 A1* | 1/2005 | Hampapur et al. | 348/143 |
| 2005/0134685 A1* | 6/2005 | Egnal et al. | 348/157 |
| 2005/0206726 A1 | 9/2005 | Yoshida et al. | |
| 2005/0219361 A1* | 10/2005 | Aoki et al. | 348/159 |
| 2008/0225121 A1* | 9/2008 | Yoshida et al. | 348/159 |
| 2009/0092326 A1* | 4/2009 | Fukuhara et al. | 382/233 |
| 2009/0262195 A1* | 10/2009 | Yoshida et al. | 348/159 |
| 2011/0074953 A1* | 3/2011 | Rauscher et al. | 348/144 |

FOREIGN PATENT DOCUMENTS

| | | |
|---|---|---|
| JP | 9-305891 | 11/1997 |
| JP | 11-178076 | 7/1999 |
| JP | 2004-032680 | 1/2004 |
| JP | 2004-236235 | 8/2004 |
| JP | 2004-363974 | 12/2004 |
| JP | 2005-295424 | 10/2005 |
| WO | 2005/076621 | 8/2005 |
| WO | 2006/067947 | 6/2006 |

OTHER PUBLICATIONS

A. M. Turing, "The chemical basis of morphogenesis", Phil. Trans. R. Soc. Lond., vol. 237, (Aug. 1952), pp. 37-72.

Youhei Nishizawa et al., "MAGIC Surfaces: Magnetically Interfaced Surfaces for Ubiquitous Computing Applications", Nov. 2005 and its partial translation (p. 2, lines 30-32 of third paragraph of Chapter 1; p. 2, last paragraph of Chapter 1; p. 2, Chapter 2).

Hisashi Kurasawa et al., "User Posture and Movement Estimation Based on 3-Axis Acceleration Sensor Position on the User's Body", May 2006 (corresponds to Non-patent reference 3 cited in the specification) and its partial translation (p. 2, Sections 2.1 and 2.2 of Chapter 2; pp. 3 and 4, Chapter 4; pp. 4 and 5; Chapter 5).

Kazuki Hirasawa et al., "Implementation and Evaluation of a Distributed Ultrasonic Positioning System", May 2004 (corresponds to Non-patent reference 4 cited in the specification) and its partial translation (p. 1, second to fourth paragraphs of Chapter 1; pp. 1-4, Chapter 2).

Allen B. Downey et al., "Using pathchar to estimate Internet link characteristics", 1999, pp. 241-250 (corresponds to Non-patent reference 5 cited in the specification).

Robert L. Carter et al., "Measuring Bottleneck Link Speed in Packet-Switched Networks," (Mar. 1996), pp. 1-24 (corresponds to Non-patent reference 6 cited in the specification).

Jordi Ribas-Corbera et al., "Rate Control in DCT Video Coding for Low-Delay Communications," IEEE Transactions on Circuits and Systems for Video Technology, vol. 9, No. 1, Feb. 1999, pp. 172-185 (corresponds to Non-patent reference 7 cited in the specification).

Naruatsu Baba et al., "Head finder: A Person Tracking System Based on Frame Difference", 2000 (corresponds to Non-patent reference 8 cited in the specification) and its partial translation (p. 1, Chapter 1, second and third paragraphs; pp. 1 and 2, Chapter 2).

J. L. Barron et al., "Performance of optical flow techniques", 1994, (corresponds to Non-patent reference 9 cited in the specification, although this document is not the same as the cited non-patent reference 9.

* cited by examiner

FIG. 4
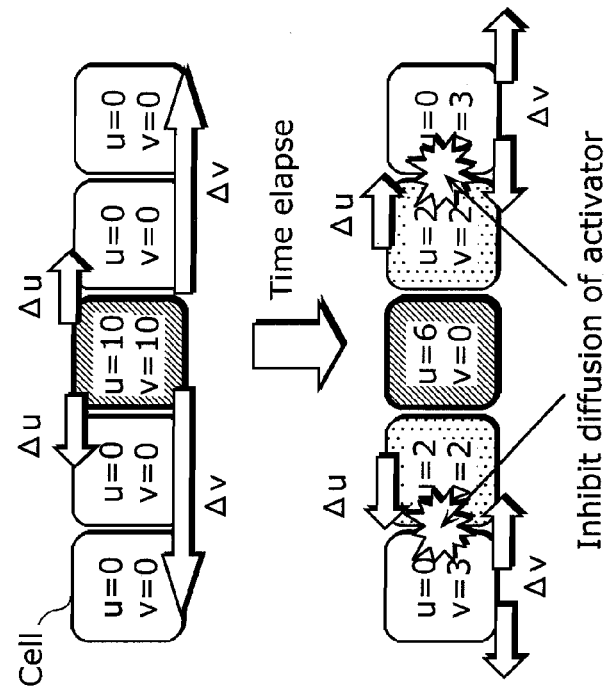
(a) Diffusion phenomenon
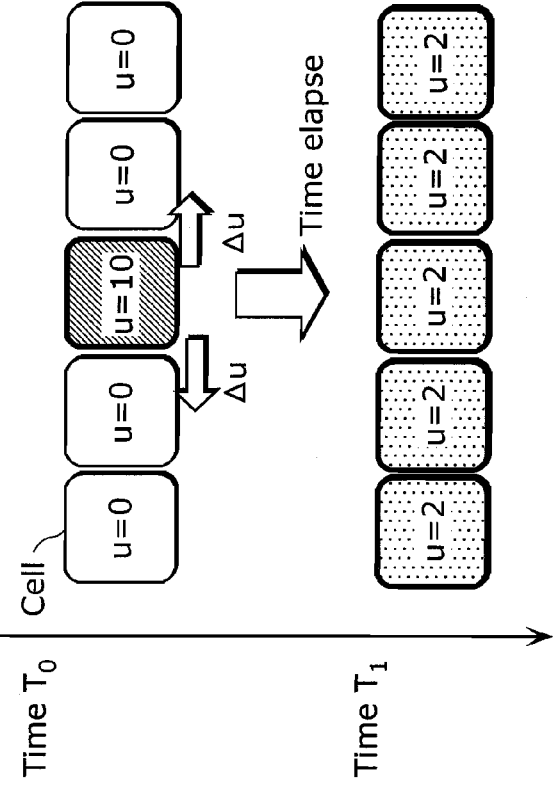
(b) Reaction-diffusion phenomenon

FIG. 7

| Camera ID | Position identification information | Collaboration parameter | Target code amount |
|---|---|---|---|
| 001 | Latitude: 135, Longitude: 40, Height: 34 | u: 100, v: 123 | Q (bps) |

701

FIG. 8
☐ Region having large value of collaboration parameter u
■ Region having small value of collaboration parameter u
(a) bistable
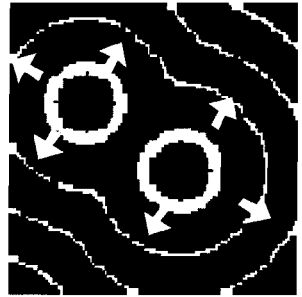
Position of object
Value of coefficient
a = 0.1, b = -0.06,
c = 0.0, d = 0.05,
e = 0.05, f = 0.1,
g = -0.1,
$D_u(s) = 0.01$,
$D_v(s) = 0.01$
(b) spot
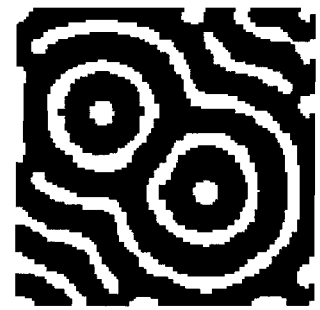
Value of coefficient
a = 0.08, b = -0.08,
c = 0.02, d = 0.03,
e = 0.01, f = 0.06,
g = -0.15,
$D_u(s) = 0.02$,
$D_v(s) = 0.5$
(c) pulse train
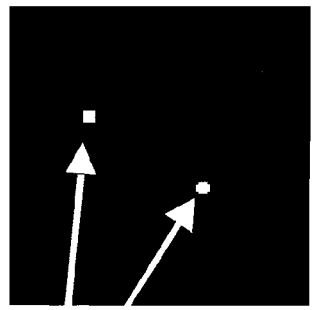
Value of coefficient
a = 0.08, b = -0.08,
c = 0.04, d = 0.03,
e = 0.06, f = 0.03,
g = -0.15,
$D_u(s) = 0.01$,
$D_v(s) = 0.25$

FIG. 9

(a) Distribution of collaboration parameter u (bistable)

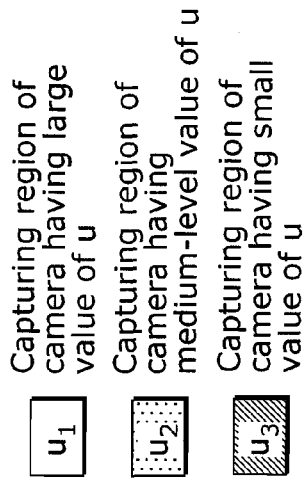
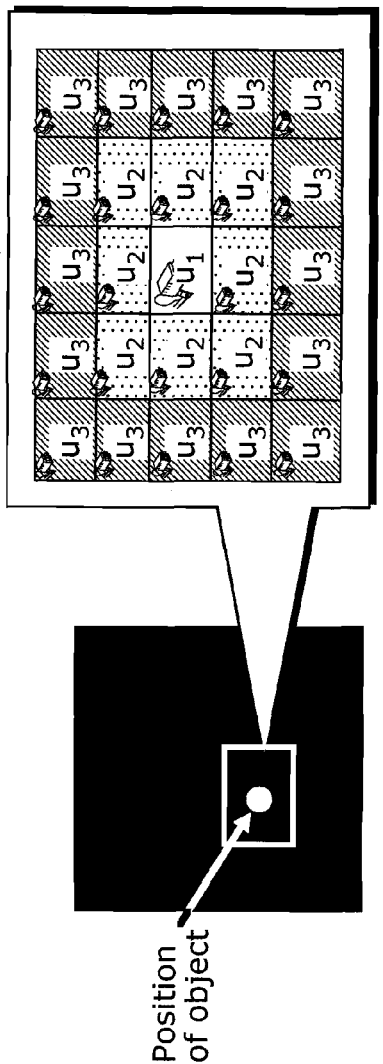

$u_1$ Capturing region of camera having large value of u $u_2$ Capturing region of camera having medium-level value of u $u_3$ Capturing region of camera having small value of u $Q_1$ Camera having large target code amount Q $Q_2$ Camera having medium-level target code amount Q $Q_3$ Camera having small target code amount Q (b) Distribution of target code amount Q (b-1)
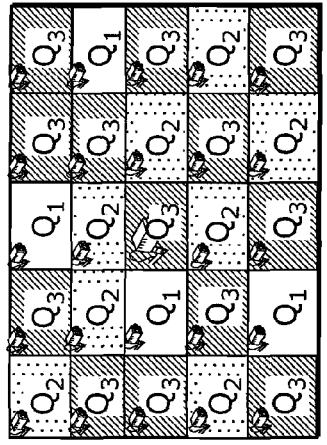

(b-2)
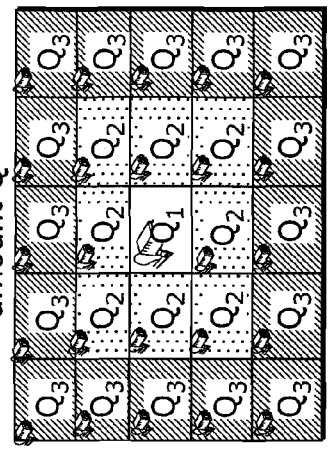

(Expression 6)
$$h = \frac{1}{N}\sum_{i}^{N}\left(\frac{u}{u_{ni}} Q_{ni}\right)$$

Distribution of target code amount Q is made closer to the distribution of collaboration parameter u N: number of collaboration partners for each camera

| Camera ID | Position identification information | Collaboration parameter | Target code amount | Diffusion coefficient |
|---|---|---|---|---|
| 001 | Latitude, longitude, and height | u: v: | Q (bps) | Du(s), Dv(s) |

(b)

| Camera ID | Position identification information | Collaboration parameter | Target code amount | Diffusion coefficient | Application range | Application time |
|---|---|---|---|---|---|---|
| 001 | Latitude, longitude, and height | u: v: | Q (bps) | Du(s), Dv(s) | Within a 5-meter distance from the object | 120 secs after coefficient is changed |

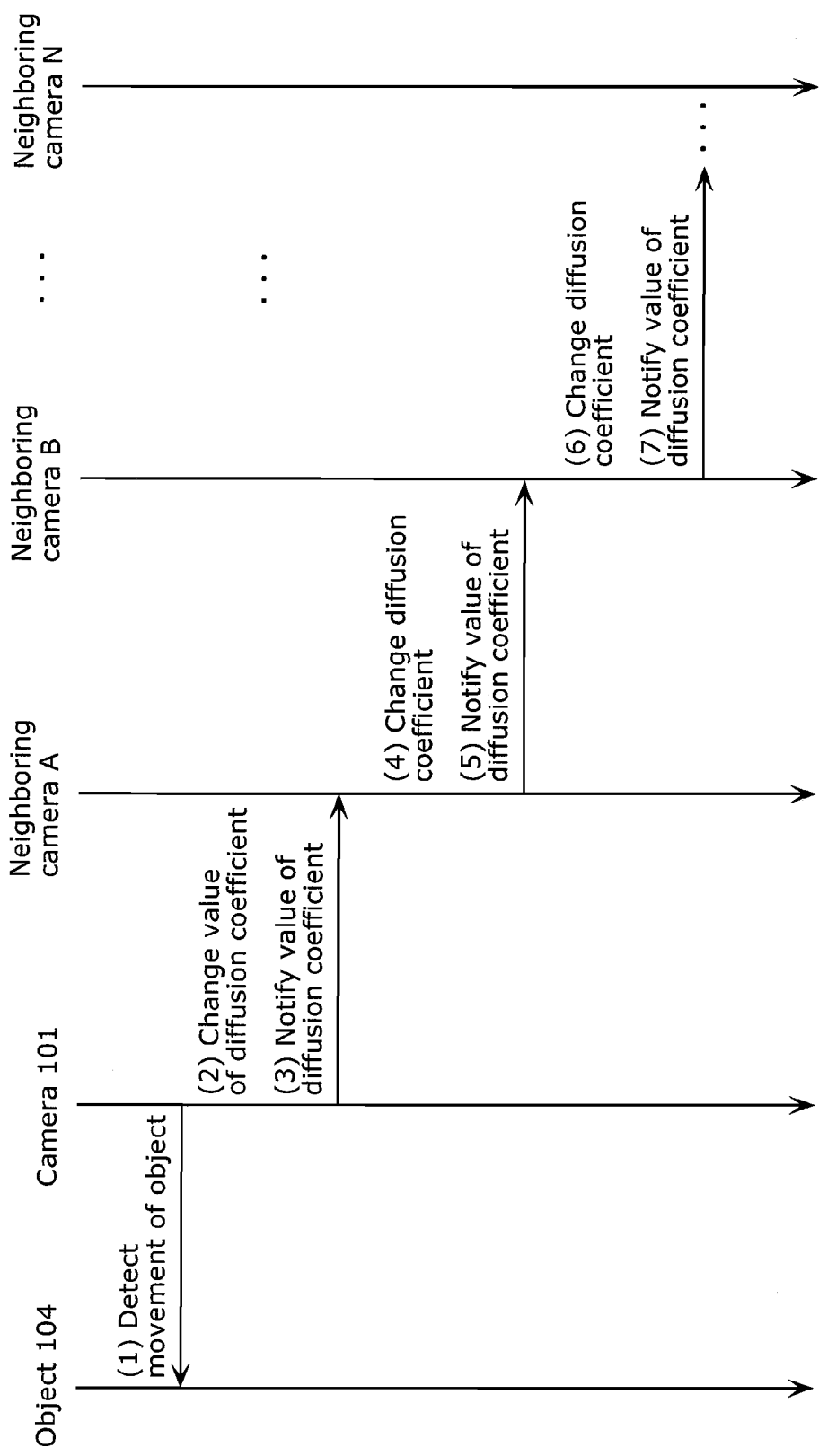

FIG. 16

(a) Information instructing change in distribution pattern

| Monitor ID (Operator ID) | Collaboration method | |
|---|---|---|
| | Expression | Coefficient |
| 103 | $\begin{cases} \frac{\partial u}{\partial t} = au - bv + D_u \nabla^2 u \\ \frac{\partial v}{\partial t} = du - ev + D_v \nabla^2 v \end{cases}$ | $a = 0.1\ b = -0.01$ $D_u(s) = 0.05\ D_v(s) = 0.2 \cdots$ |

2201

(b) When collaboration method is preset in camera

| Monitor ID (Operator ID) | Preset number |
|---|---|
| 103 | 003 |

2202

FIG. 17
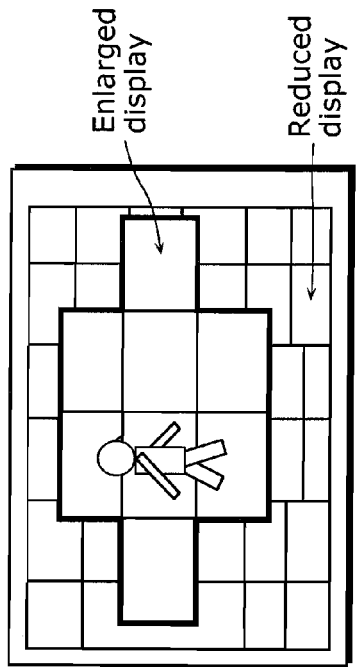
(a) State of code amount assignment
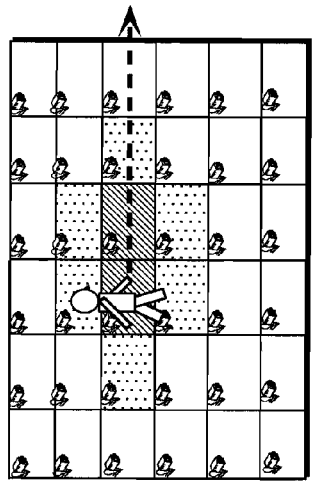
(b) GUI display screen
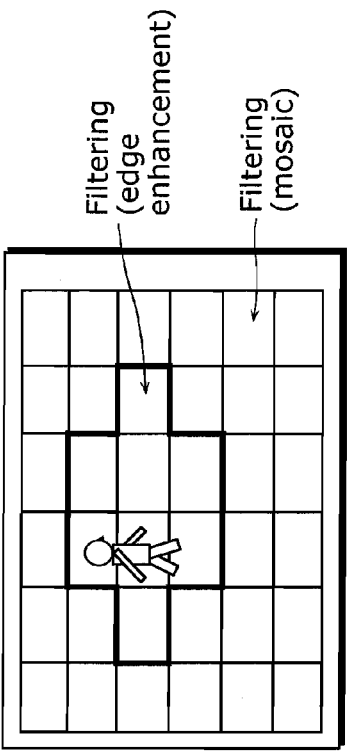
(c) GUI display screen
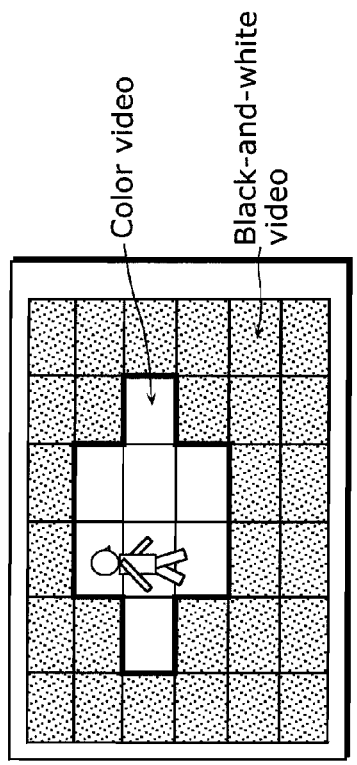
(d) GUI display screen

FIG. 21

| Area number | Area range | Collaboration method | Coefficient |
|---|---|---|---|
| 001 | North latitude: 34° 41' 0" 5 to 34° 41' 0" 6<br>East longitude: 135° 31' 47" 3 to 135° 31' 47" 2 | $\begin{cases} \frac{\partial u}{\partial t} = au - bv + D_u \nabla^2 u \\ \frac{\partial v}{\partial t} = du - ev + D_v \nabla^2 v \end{cases}$ | a = 0.1<br>Du(s) = 0.05<br>Dv(s) = 0.2<br>... |
| 002 | North latitude: 34° 33' 33" 6 to 34° 33' 33" 7<br>East longitude: 135° 29' 25" 2 to 135° 29' 25" 3 | $\begin{cases} \frac{\partial u}{\partial t} = auv^2 - bv + D_u \nabla^2 u \\ \frac{\partial v}{\partial t} = d\frac{u^2}{v} - eu + D_v \nabla^2 v \end{cases}$ | a = 0.123<br>Du(s) = 0.15<br>Dv(s) = 0.5<br>... |
| ... | ... | ... | ... |

1801

FIG. 24
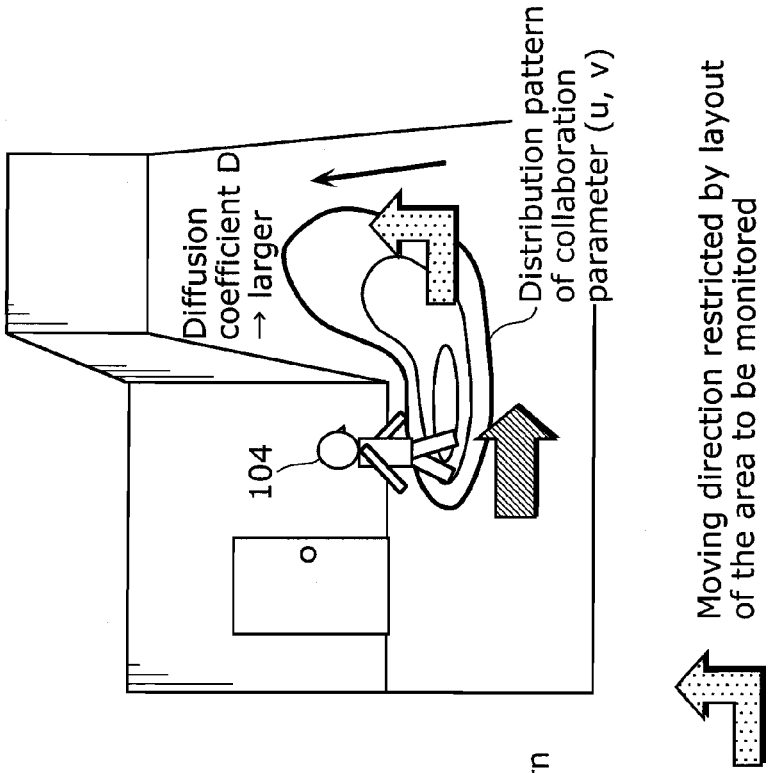
(b) Parameter distribution also considering layout of the area to be monitored
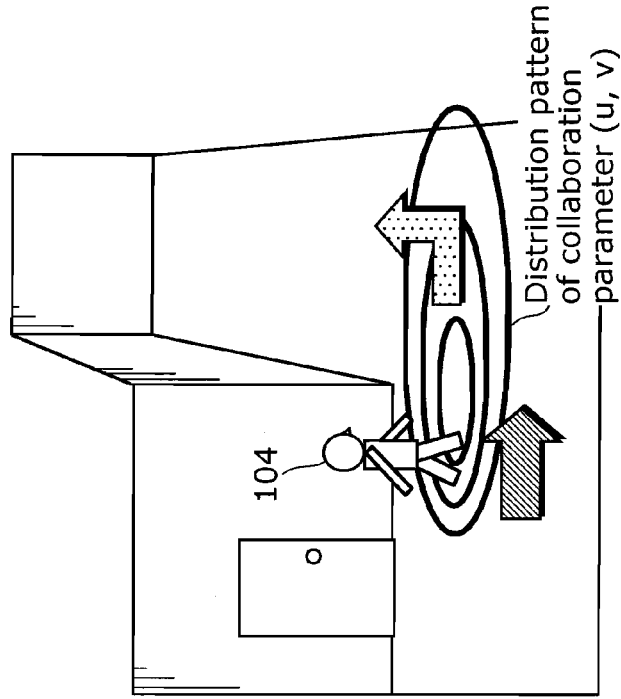
(a) Parameter distribution considering only the movement of object

MONITORING SYSTEM, CAMERA, AND VIDEO ENCODING METHOD

TECHNICAL FIELD

The present invention relates to a monitoring system including plural cameras, and relates in particular to a monitoring system and a camera, which automatically adjust the code amount for data transmitted from the cameras via a network, based on the monitoring conditions of each of the cameras (the presence or absence and movement of an object or an abnormal point).

BACKGROUND ART

Recently, functions and services to distribute videos from plural monitoring cameras have been provided via networks such as the Internet and LANs.

Conventionally, for an apparatus which adjusts the code amount (coding rate) of videos distributed from plural cameras, there is an apparatus which determines, in a centralized manner, the assignment of code amounts to all the cameras (See Patent Reference 1).

Patent Reference 1 discloses a technique for promoting efficient use of a network by: automatically assigning the band (code amount) for each camera, based on an instruction from a console processing apparatus which collectively sets the transmission bands for plural cameras, so that the summation of the data, which is distributed from the plural cameras distributing videos at a constant bit rate, does not exceed a predetermined transmission capacity; and reassigning the bands, in the case where the traffic in the network increases, so that the transmission band of each camera automatically becomes narrower.

In addition, there is another conventional technique which allows the code amounts of videos distributed from cameras to be autonomously judged and adjusted by the respective cameras themselves. In these conventional techniques, a predetermined object or abnormality is detected with sensors, image processing, and so on, and the code amount value of the video to be distributed is changed based on the detected details (See Patent References 2 and 3).

Patent Reference 2 discloses the following technique: when a network camera which distributes a video on a network such as a LAN and the Internet detects the presence of an object with a sensor, the network camera switches the video capturing mode, from the first capturing mode in which ordinary capturing is performed, to the second capturing mode in which capturing is performed with higher resolution and at a lower frame rate than in the first capturing mode, thereby avoiding the distribution of an unnecessarily large amount of video pictures to the network in the case where no object is present.

In addition, Patent Reference 3 discloses the following technique: when a monitoring camera which remotely monitors a traffic state detects the traffic as abnormal, the monitoring camera decreases the compression rate for the monitoring video and automatically distributes, as a high-quality monitoring video, the picture of the spot on which the abnormality is occurring.

Patent Reference 1: Japanese Unexamined Patent Application Publication No. 2004-32680
Patent Reference 2: Japanese Unexamined Patent Application Publication No. 2004-236235
Patent Reference 3: Japanese Unexamined Patent Application Publication No. 9-305891

DISCLOSURE OF INVENTION

Problems that Invention is to Solve

However, for the technique disclosed in Patent Reference 1, in which the code amounts (bands and transmission rates) of the plural cameras are adjusted, with respect to all of the cameras, in a centralized manner, there is a problem in terms of expandability that the number of cameras capable of the real-time adjustment of code amounts (bands and transmission rates) is limited, since the processing time required for the reassignment of code amounts (bands and transmission rates) to respective cameras increases as the number of such cameras becomes larger.

In addition, in the centralized adjustment of code amounts as described in Patent Reference 1, there is another problem in terms of fault-tolerance that in the case of malfunction of a monitoring apparatus which collectively adjusts code amounts (bands and transmission rates), the adjustment of code amounts becomes impossible for all the cameras.

In addition, in the techniques disclosed in Patent References 2 and 3, the code amount (the number of pixels, frame rate, compression rate) is changed based on the detection of an object or the detection result of an abnormal traffic state. However, it is difficult to rapidly change the code amount for transmitted data since, generally, the changing of amount of data transmitted via a network such as a LAN and the Internet is performed in consideration of the level of traffic congestion caused by the variation of the transmitted data.

Therefore, in the techniques described in Patent References 2 and 3, there is a problem that, in the case where the code amounts (the number of pixels, frame rates, compression rates, an so on) of videos distributed to the network are changed after detecting an object or abnormality, it takes time for the code amount (the number of pixels, frame rate, compression rate, and quantization step) of the distributed video to attain an appropriate value, and this results in a lowering of the ability to trace the behavior of an object or abnormality.

In addition, in the techniques described in Patent References 2 and 3, there is also a problem that, in the case where respective cameras change their code amounts autonomously based on the result of abnormality detection, the traffic, flowing through the network, increases at a time when respective cameras detect an object or abnormality simultaneously, and this results in a lowering of utilization efficiency of the transmission line.

Hereinafter, the problems in the techniques as described in Patent References 2 and 3 shall be described with reference to the drawings. FIG. 1 is a diagram describing the problem of a camera according to the conventional techniques, as disclosed in the above Patent References 2 and 3, which adjusts the value of its code amount autonomously. In FIG. 1, a camera 101A and a camera 101B have a function to detect the object 104 by image processing when an object 104 appears in a video capturing region, and increase their code amount values autonomously by increasing the quantization step size (QSTEP) and frame rate for the video to be distributed.

In FIG. 1, at time $T_0$, only the camera 101A is capturing video of the object 104, and the assignment of code amounts is adjusted so that the code amount for the camera 101A becomes larger and that the code amount for the camera B becomes smaller. However, at time $T_1$, when the cameras 101A and 101B switch to the state of capturing the object at the same time, both cameras distribute videos of an identical object 104 redundantly with large code amounts. Therefore, in the case where respective cameras operate autonomously, there is a case where utilization efficiency of the transmission band of a communication network 102 becomes deteriorated.

In this manner, there is a problem that, in the case where plural cameras change their code amounts autonomously, a situation arises which results in the lowering of utilization efficiency of the communication network 102.

In addition, generally, in video distribution using a communication network such as the Internet and a LAN, a method is taken by which the condition of the transmission line is measured, and the values of transmission amounts are adjusted little by little while checking that no data delay or collision is occurring. Therefore, video distribution in which the transmission rate is rapidly changed cannot be performed. In other words, since the transmission amounts are adjusted little by little on the network side, the available band in the network is unable to follow in time with the change in the code amounts of the cameras, and it takes time until the code amounts are changed to appropriate values by detecting the object, and this results in the lowering of the ability to trace the movement of the object.

In addition, in the case where the transmission amounts from the cameras are rapidly increased without measuring the traffic condition of the transmission line, the network cannot trace the fluctuation of load, and congestion occurs, causing picture quality deterioration on the receiving side.

The present invention is conceived in view of these points and has as an object to provide a monitoring system, a camera, and so on, which have, in the automatic adjustment of code amounts for respective cameras in a monitoring system which distributes video from plural cameras via a common network, expandability and fault tolerance that are independent of the number and structure of the cameras making up the monitoring system, and further, which enable the capturing with a high level of ability to trace the movement of the object, and which can perform automatic assignment of code amounts that improves the utilization efficiency of the entire transmission line. In other words, the object of the present invention is to provide a monitoring system, a camera, and so on, which can efficiently determine, according to the movement of the object and so on, the code amount for each camera which is a monitoring camera.

In addition, another object of the present invention is to provide a monitoring system, a camera, and so on which can continue capturing video with a large code amount, in an area to be monitored for which the level of monitoring importance differs from place to place, even when the object suddenly changes its moving direction toward a region of higher importance.

Furthermore, another object of the present invention is m to provide a monitoring system, a camera, and so on which can reduce the trouble for a user of finding out which camera is monitoring an object or an abnormal point from among a number of cameras, and improve the utilization efficiency of the recording medium such as a hard disk in the case where video pictures are recorded.

Means to Solve the Problems

In order to solve the above problems, the monitoring system according to the present invention includes plural cameras connected through a transmission path, and each of the cameras includes: an object detecting unit which detects an object that is a moving object to be monitored; a video capturing unit which captures the object detected by the object detecting unit so as to obtain video; a video encoding unit which encodes the video obtained by the capturing unit; a collaboration parameter storage unit for storing a collaboration parameter indicating a relative amount of a target code amount assigned to a camera and a target code amount assigned to a neighboring camera, the target code amount being a target value for video encoding, and the neighboring camera being a predetermined camera, among the plural cameras, that is located near the camera; a communication interface unit which exchanges, by communicating with the neighboring camera, the collaboration parameter stored in the collaboration parameter storage unit of the camera and the target code amount assigned to the camera; a neighboring camera information storage unit for storing position identification information for identifying a position of the neighboring camera, as well as the collaboration parameter and the target code amount for the neighboring camera that are obtained by the communication interface unit; a collaboration parameter updating unit which updates the collaboration parameter stored in the collaboration parameter storage unit, based on a position of the object detected by the object detecting unit as well as the position identification information and the collaboration parameter of the neighboring camera that are stored in the neighboring camera information storage unit, so that (i) a distribution pattern, which indicates a distribution of a value of the collaboration parameter in a space in which the plural cameras are present, forms concentric circles having the object detected by the object detecting unit as an origin, and that (ii) the target code amount for a camera capturing the object becomes larger than the target code amount for a camera not capturing the object; and a target code amount determining unit which determines the target code amount to be assigned to the camera, based on the collaboration parameter updated by the collaboration parameter updating unit as well as the collaboration parameter and the target code amount for the neighboring camera that are stored in the neighboring camera information storage unit, and wherein the video encoding unit which encodes the video so that an amount of code generated in the encoding attains the target code amount determined by the target code amount determining unit.

Note that the object in the Claims is a concept which includes the "object" and the "abnormal point" in the embodiments.

Here, the present invention can be implemented not only as a monitoring system, but also as a camera making up the monitoring system, a video encoding method in the camera, a program which causes a computer to execute the video encoding method, and a computer-readable recording medium, such as a CD-ROM, on which the program is recorded.

EFFECTS OF THE INVENTION

According to the monitoring system and the camera in the monitoring system in the present invention, it is possible to make gradual adjustments taking the movement speed of the object into consideration and based on the positions of plural cameras and the movement of the object, so that the code amount for a camera placed in the moving direction of the object becomes larger in advance. Accordingly, this produces an effect of being able to trace the movement of the object and continuously distribute, with low-loss and low-delay, high-quality videos with a code amount increased as compared to those of surrounding regions, without causing any congestion on the network side due to rapid increases in transmission amounts from the cameras.

In addition, even among cameras that are capturing regions closer to the object, it is possible to adjust code amounts automatically in advance, in order to make the code amount smaller for a camera having a low possibility of capturing the object as estimated from the movement of the object. Accordingly, this produces an effect of improving the utilization efficiency of the entire transmission line.

Furthermore, an effect is produced which enables a continuous distribution of a high-quality video with a code amount larger than the code amounts of the videos of surrounding spaces, even when, in the case where information on an area of particularly high monitoring importance within the area to be monitored is assigned to each camera, the object suddenly starts to approach a region of higher importance.

In addition, since a large code amount is automatically assigned to a camera which is capturing the object and its surroundings from among a number of cameras, it becomes possible to find out the camera which is capturing the object and its surroundings to be displayed on the monitor, by simply identifying the camera with a large code amount, and thus reduce the trouble of finding out the camera.

In addition, videos are automatically encoded so that a video in which the object is present is coded as a high-quality video having a large code amount and that the other videos are coded as low-quality videos having small code amounts. Therefore, in the case where the captured videos are recorded onto a recording medium such as a hard disk, video data of lower-level importance in which no object is present is automatically compressed into a smaller size and stored, and thus this produces an effect of efficient utilization of the recording medium.

BRIEF DESCRIPTION OF DRAWINGS

FIG. 4(a) and (b) are a diagram describing the pattern forming by a reaction-diffusion phenomenon.

FIG. 7 is a diagram showing the content of the data transmitted or received between the cameras.

FIG. 8(a), (b), and (c) are a diagram describing the operation of the cameras (an example of the distribution of a collaboration parameter).

FIG. 9(a) and (b) are a diagram describing the operation of the cameras (examples of the distribution of the collaboration parameter and the target code amount).

FIG. 12(a) and (b) are a diagram showing the content of the data transmitted and received between the cameras.

FIG. 13 is a diagram of the communication sequence in the first embodiment.

FIG. 16(a) and (b) are a diagram showing the content of the data transmitted from a surveillance monitor to each camera.

FIG. 17(a), (b), (c), and (d) are a diagram describing an example of a monitoring video displayed on the surveillance monitor.

FIG. 21 is a diagram showing an example of the details of the priority monitoring area information.

FIG. 24(a) and (b) are a diagram describing Embodiment 2-2 (an example of adjusting the details of collaboration with neighboring cameras) in the second embodiment.

NUMERICAL REFERENCES

Figure 1:
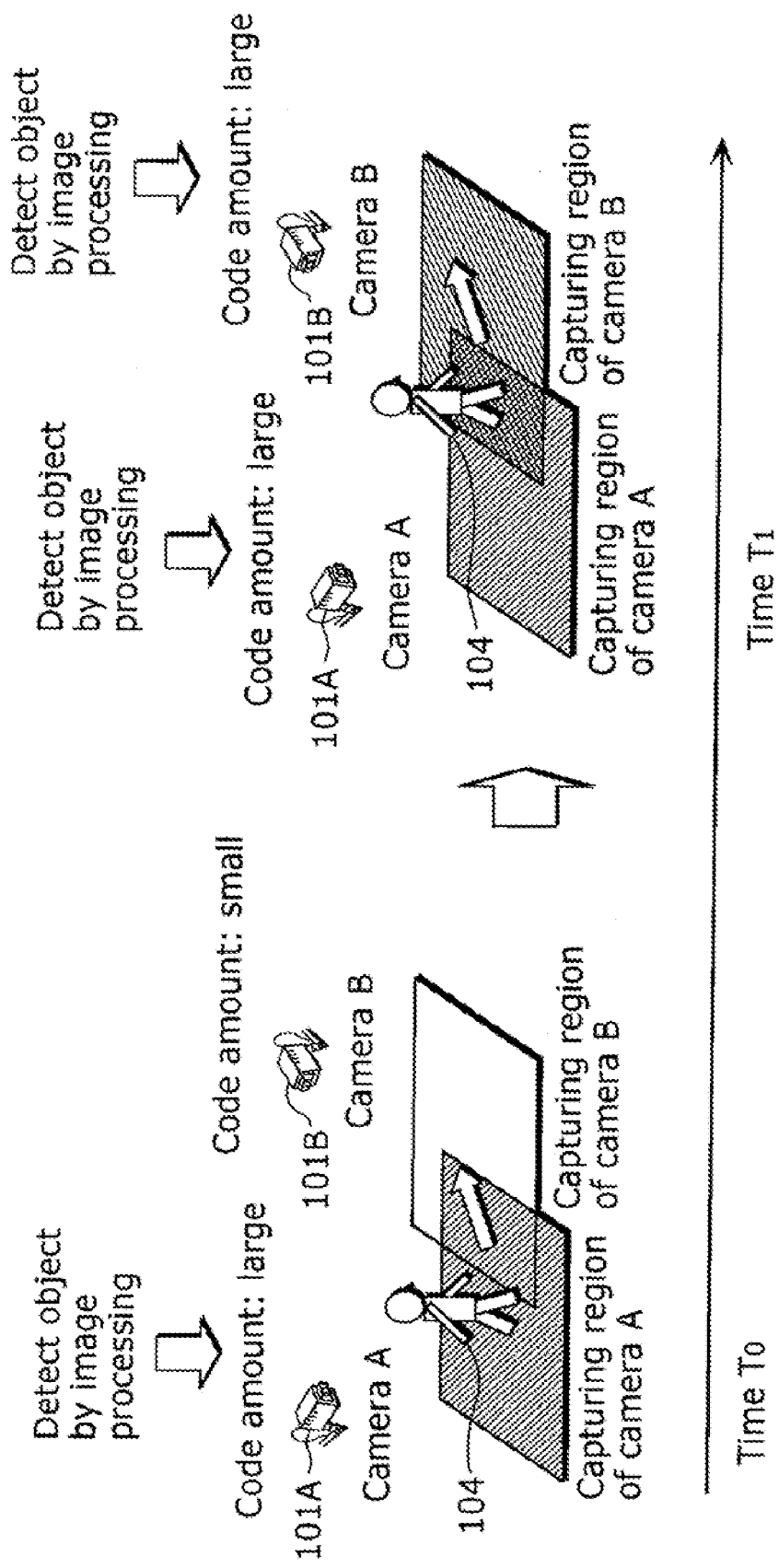
FIG. 1 is a diagram describing an example of assignment of code amounts in the conventional technique.

101 Camera
101N, 101A, 1016, 101L, 101R Neighboring camera
102 Communication network
103 Surveillance monitor
104 Object
105 Operator
106, 401 Sensor
402 Capturing unit
403 Communication interface
404 Collaboration parameter storage unit
405 Neighboring camera information storage unit
406 Collaboration partner selecting unit
407 Collaborating operation executing unit
408 Autonomous operation executing unit
409 Transmission band estimating unit
410 Target code amount determining unit
411 Video encoding unit
412 Image processing unit
413 Collaboration parameter updating unit
414 Priority monitoring area storage unit
701 Details of transmitted and received data
1401 Live video monitor
1402 Synthesized video monitor
1403 Monitoring pattern selecting panel
1404 Setting panel
1405 Synthesis range setting panel
1501 In-vehicle camera
1502 Transmitting and receiving antenna
1503 Monitoring camera
1601 Mobile camera
1602 Receiving base station
1603 Content provider
1604 Video receiving terminal
1801 Priority monitoring area
2001 Priority monitoring area
2002 Safe
2003 Entrance door
2201, 2202 Information transmitted from the surveillance monitor to each camera
$T_0, T_1$ Time

BEST MODE FOR CARRYING OUT THE INVENTION

Hereinafter, embodiments of the present invention shall be described with reference to the drawings.

First Embodiment

First, an outline of the monitoring system in a first embodiment of the present invention shall be described.

Figure 2:
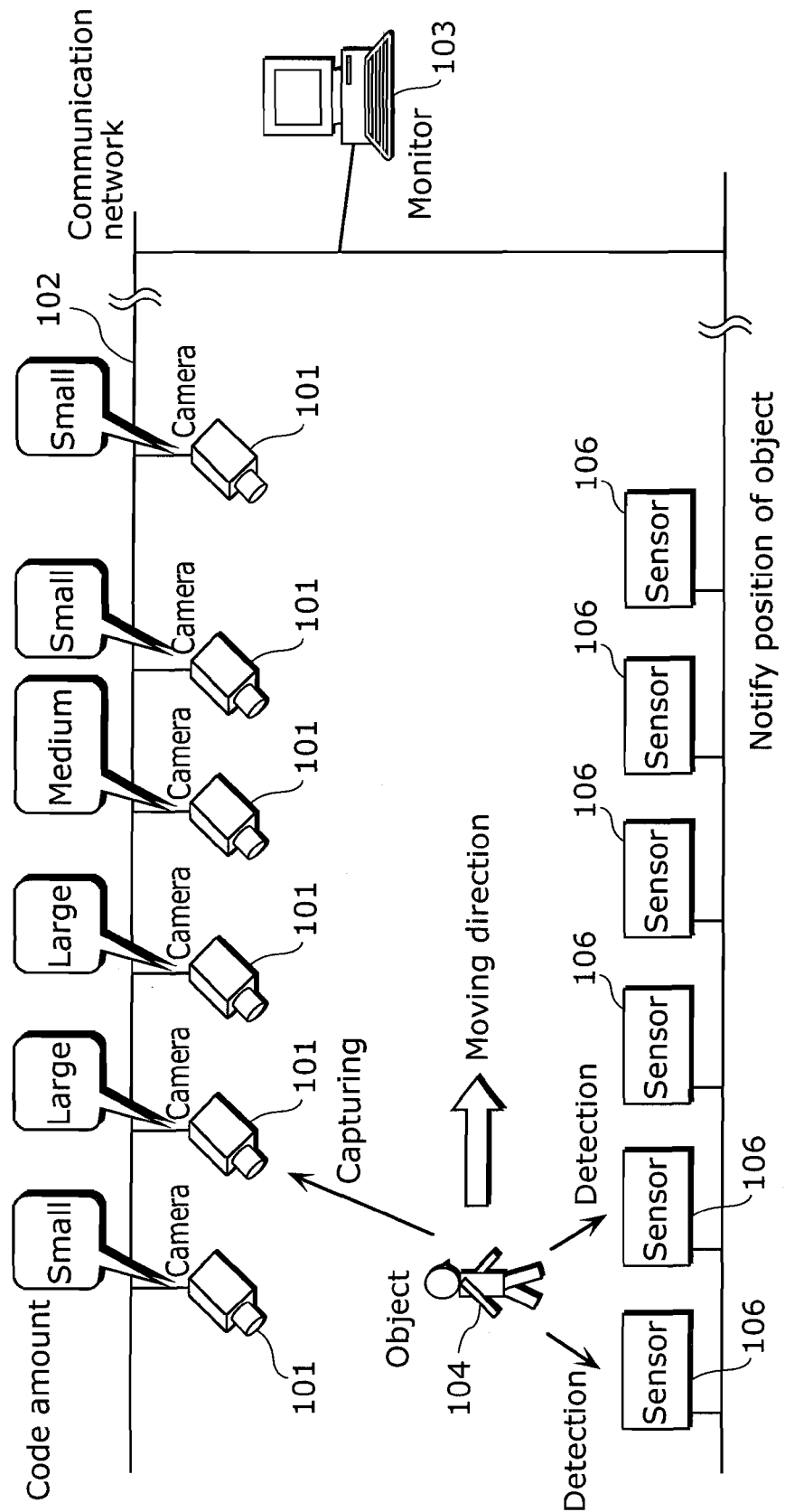
FIG. 2 is a diagram describing a concept of the structure of the monitoring system in the present invention.

FIG. 2 is a diagram describing a mode of use for the monitoring system in the first embodiment of the present invention.

FIG. 2 illustrates a structure of the monitoring system in which videos captured by plural cameras 101 are distributed to a surveillance monitor 103 via a communication network 102 in town monitoring, indoor monitoring, an intelligent transport system (ITS), and so on. This monitoring system is a system for monitoring an object while making automatic adjustments to the code amounts for the plural cameras 101 having an identical function. The monitoring system includes: the plural cameras 101, plural sensors 106, a surveillance monitor 103, and a communication network 102 connecting them.

Note that a camera 101 may not only be a fixed camera but also be a moving camera, such as a camera equipped on a cell-phone or an in-vehicle camera. A sensor 106 is an infrared sensor or the like which detects an object 104 and an abnormal point. The communication network 102 is an example of transmission lines and may be wired (such as an Ethernet™ and a cell-phone) or may be wireless (such as a wireless LAN and a cellular phone). In addition, the surveillance monitor 103 is a terminal apparatus including a display which receives and decodes encoded videos transmitted from the plural cameras 101, spatially synthesizes the decoded videos according to the positions of the plural cameras 101, and displays the obtained synthesized video. There are no restrictions on the number, the connection method, and the performance of terminal apparatuses, and specifically any terminal equipped with a function to display videos may be used, such as a PC, a TV, a cell-phone, and a car navigation system. The camera 101 has a function to detect the object 104 or an abnormal point by image processing of the captured video or by an exterior sensor 106. Moreover, upon detecting the object or the abnormal point, the camera 101 has a function to adjust the video to be distributed with a given code amount (coding rate) and distribute the adjusted videos by changing its own frame rate, quantization step size, or the like of the camera 101.

Note that an "object" that is assumable in town monitoring, indoor monitoring such as building security, an ITS, and so on, can be a moving object such as a passenger and a car, and that an "abnormal point" can be a point of abnormality generated in a monitoring target, such as a site in which a prowler appears, an object who is sick, a site where a fire has broken out, a point at which a window is broken, and a site where a traffic accident occurs.

The first embodiment of the present invention is to provide a monitoring system in which the assignment of code amounts to the plural cameras 101 is automatically adjusted and a camera used in the monitoring system while considering the utilization efficiency of the transmission band of the communication network 102 so that the video of a place where an object or abnormal point has occurred is distributed with a large code amount and that the videos of other places are distributed with small code amounts.

Figure 3:
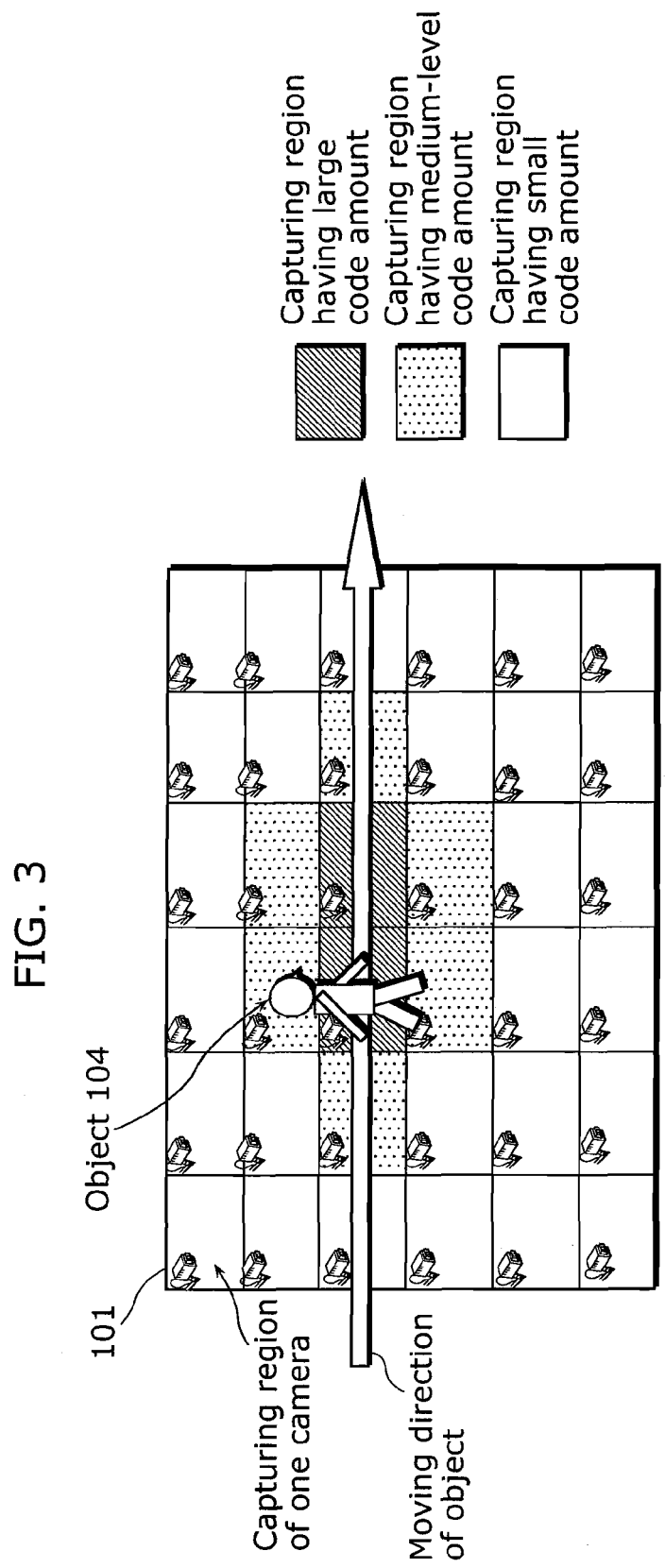
FIG. 3 is a diagram showing an example of efficient assignment of code amounts.

With respect to the above-described problems in the conventional techniques, that is, the problems of deterioration in the utilization efficiency of the transmission line and the ability to trace the movement of the object, the monitoring system in the first embodiment solves such problems by assigning code amounts to respective cameras in consideration of the positions of the plural cameras. FIG. 3 shows an exemplary method for assigning code amounts, which is to realize the solution of the problems.

FIG. 3 is a diagram showing, in three types of patterns according to respective sizes (large, medium, and small), the values of code amounts assigned to the plural cameras 101 surrounding the object based on the positions of the plural cameras laid out in a plane-like state (the layout of a video capturing region) and the position of the object 104.

As shown in FIG. 3, in the monitoring system of the first embodiment, a code amount of the largest value is assigned to a region in which the object 104 is present, and further, larger code amounts are assigned, in advance, to the moving direction of the object 104 as well as to neighboring spaces. With this, even when the object 104 appears in the capturing space of a neighboring camera, a video can be distributed immediately with a large code amount.

In addition, with respect to a region located in a direction opposite to the moving direction of the object 104, since the probability of appearance of the object 104 is low even when the distance from the object 104 is short, the utilization efficiency of the transmission band can be improved by assigning a lower code amount to the region.

The monitoring system in the present embodiment solves the problem of assigning code amounts to videos distributed by plural cameras, by automatically forming, as shown in FIG. 3, a distribution pattern (spatial pattern) of the code amounts with respect to the plural cameras 101 laid out in a real space. Hereinafter, the method for automatically adjusting the assignment of code amounts to plural cameras shall be described.

In addition, in order to achieve high expandability and high fault-tolerance, the monitoring system in the present embodiment automatically adjusts the assignment of code amounts as shown in FIG. 3, by causing respective cameras to adjust their own code amounts collaborating with each other without using an apparatus which intensively controls the plural cameras. As shown in FIG. 3, the monitoring system in the present embodiment allows: (i) assignment of a larger code amount, with respect to a capturing region in which the object 104 is captured, as compared to a capturing space in which the object 104 is not captured; (ii) assignment of a larger code amount, with respect to a capturing space closer to the object 104, as compared to a distant capturing space; and (iii) assignment of a larger code amount, with respect to a capturing space located in the moving direction of the object 104, as compared to a capturing space located in a direction opposite to the moving direction.

First, as a mechanism used in the monitoring system in the present embodiment, the following is a description of a mechanism which, in a general distributed system not including any intensive control apparatus, spontaneously forms spatial rules (a spatial pattern) with respect to the entire system by causing respective subsystems making up the system to locally interact with each other. Here, as a specific example of the system which forms spatial rules (a spatial pattern), the mechanism of the skin cells (subsystems) of tropical fish or the like to form a striped pattern (spatial pattern) as a whole by exchanging chemical substances with neighboring cells and thereby determining the colors of their own.

Turing mathematically shows: as is the case with the striped pattern of tropical fish, a phenomenon in which a spatial pattern is formed as a result of plural cells locally interacting with each other is achieved due to a chemical interaction and a diffusion phenomenon of chemical substances (See Non-patent Reference 1). Non-patent Reference 1: A. M. TURING, The chemical basis of morphogenesis, Phil. Trans. R. Soc. Lond. B327, pp. 37-72 (1952).

The mathematical model shown by Turing is expressed in two reaction-diffusion equations (simultaneous differential equations) shown in the following Expression 1. Equation 1 is an expression which represents the amount of increase or decrease of the concentration u of an activator involved in the positive feedback of a chemical reaction taking place within respective cells and of concentration v of an inhibitor involved in the negative feedback of a chemical reaction taking place within respective cells. In the right-hand side of Expression 1, the first term is referred to as a reaction term, which is a term determining the amount of generation and decomposition of the activator and the inhibitor in accordance with the ratio of concentrations of the activator and the inhibitor (u, v) within each cell. In addition, the second term is referred to as a diffusion term, which is a term determining the amounts of the activator and the inhibitor moving between adjacent cells due to diffusion phenomena.

[Expression 1]

$$\begin{cases} \frac{\partial u}{\partial t} = f(u, v) + D_u \nabla^2 u \\ \frac{\partial v}{\partial t} = g(u, v) + D_v \nabla^2 v \end{cases} \quad \text{(Equation 1)}$$

Note that Du(s) and Dv(s) are diffusion coefficients that determine the diffusion speed of a chemical substance between cells. In addition, f(u, v) and g(u, v) are functions of variables u and v.

FIG. 4 is a diagram showing the outline of the pattern of distribution of a chemical substance, which occurs within the cell based on Equation 1.

Normally, as shown in FIG. 4(a) (Time $T_0 \rightarrow T_1$), the chemical substance that is present within the cell moves from a cell having a high concentration of the chemical substance toward a cell having a low concentration of the chemical substance, and the level of concentration becomes the same in all the cells.

However, the activator which activates the chemical reaction and the inhibitor which inhibits the chemical reaction are different in diffusion speed, and in the case where the inhibitor diffuses to neighboring cells faster than the activator, an activator, which is trying to activate the chemical reaction, diffuses earlier into a wider range and inhibits the diffusion of the activator which diffuses later. Accordingly, as shown in FIG. 4(b) (Time $T_0 \rightarrow T_1$), a state is formed in which the concentrations of the activator and the inhibitor (u, v) within each cell are uneven.

It is known that by adjusting the balance between such chemical reaction and diffusion taking place between the activator and the inhibitor, the uneven diffusion pattern of concentrations of the activator and the inhibitor can be adjusted in various forms, such as a striped pattern as seen in tropical fish and spots as seen in leopards or the like.

In the above example, the concentrations of the activator and the inhibitor (u, v) are described as an example. However, in the monitoring system including plural cameras, the cameras correspond to the activator and the inhibitor, respectively, and reciprocally exchange the parameter for adjusting the assignment of their own code amount based on the behavior shown by the reaction-diffusion equation of Expression 1. With this, a diffusion pattern of the parameter which determines the code amount according to the position of each camera can be formed.

Furthermore, other than the parameter exchange between neighboring cameras, the pattern of assigning code amounts for the entire monitoring system can also be changed by increasing and decreasing the amount of parameters for part of the cameras based on the information from the external sensor 106 or the like which has detected the object.

In the first embodiment, a formation model of the distribution pattern of parameters, which is based on the above-described reaction-diffusion equations of Equation 1, is applied for adjustments in assignment of the code amount to each camera 101.

In the present embodiment, collaboration, a parameter (u, v) is used as the parameter exchanged between cameras 101 for making adjustments of code amounts for the plural cameras 101. Note that the collaboration parameter (u, v) is a parameter corresponding to each of the concentrations of the activator and the inhibitor within each cell.

Next, the camera 101 making up the monitoring system in the first embodiment shall be described in details.

Figure 5:
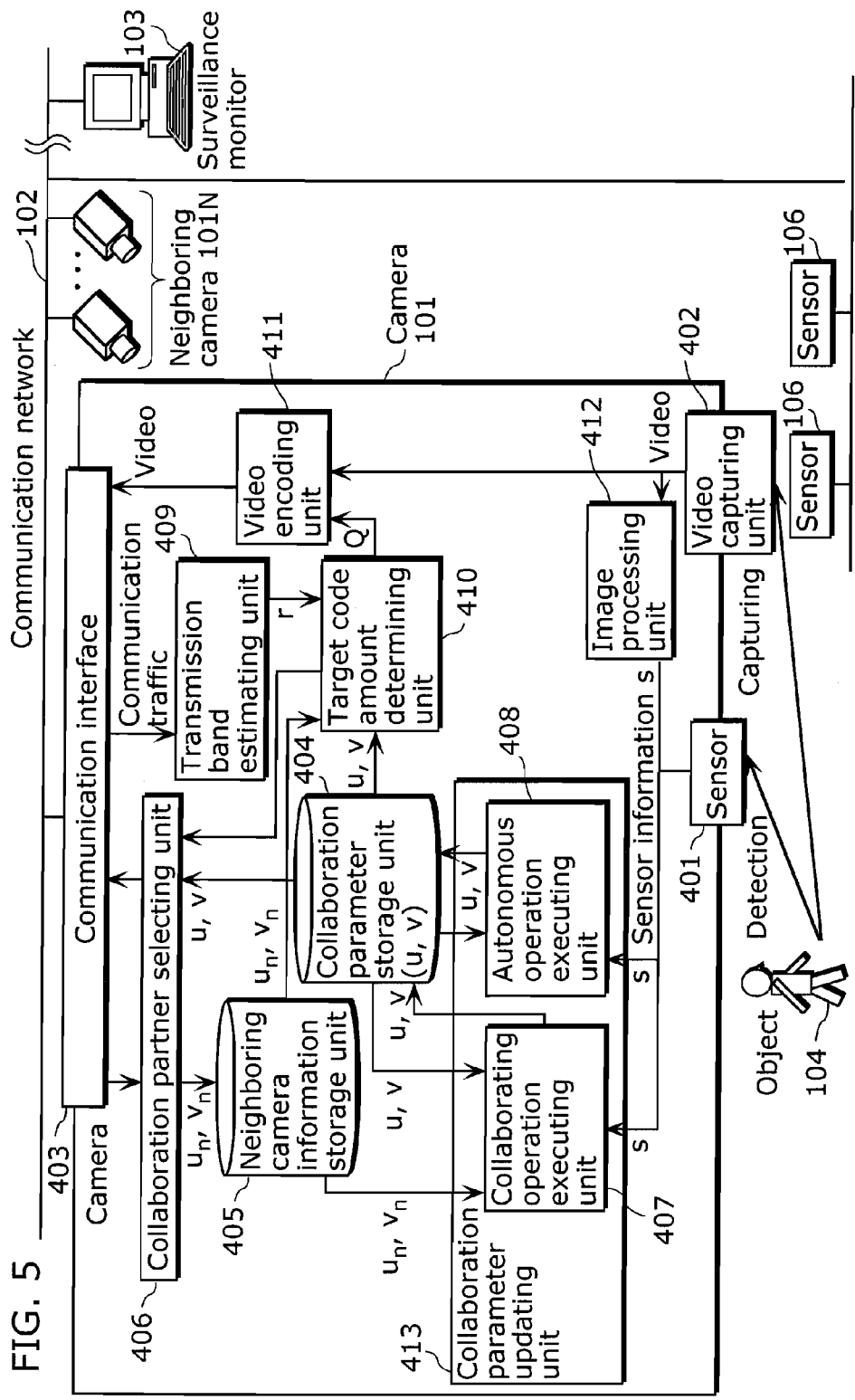
FIG. 5 is a block diagram showing the structure of the camera in the first embodiment.

FIG. 5 is a block diagram showing the structure of the monitoring system in the first embodiment. Here, the structure of one camera 101 is shown in details. Although in the figure, for sake of convenience in explanation, different numerals are given to the current camera 101 and plural neighboring cameras 101N, both of these cameras, that is, the camera 101 and the cameras 101N have the same structure. Note that regarding the same structure as in FIG. 2, the same numerals are given and the description is omitted.

As shown in FIG. 5, each camera 101 in the first embodiment has a sensor 401 which detects the behavior of the object 104 and the occurrence of an abnormal point, and a video capturing unit 402 which captures the object and the abnormal point. The sensor 401 and the video capturing unit 402 correspond to an object detection unit which detects the object 104 or an abnormal point that is present within the area to be monitored.

The detection of the position, the moving direction, and the moving speed of the object 104 using the sensor 401 is possible by the following methods: a technique in which magnetic sensors are paved in the area to be monitored, and thereby the identity, the position, and the direction of the object 104 are detected from the footprints of a permanent magnet attached to the object 104 (See Non-patent Reference 2); a technique to estimate the movement of the object according to the amount of change in acceleration that is obtained from an acceleration sensor equipped on a mobile terminal (See Non-patent Reference 3); and positioning systems using infrared radiation, radio field intensity, or ultrasonic waves, and so on, such as a GPS in which positions are measured using electric waves from a satellite (See Non-patent Reference 4).

Non-patent Reference 2: "*Jikiteki shuho wo mochiita ichihoko kenshutsu kinotogogata menjo tsushin shisutemu no sekkei to jisso* (MAGIC-Surfaces: Magnetically Interfaced Surfaces for Ubiquitous Computing Applications)" by Youhei Nishizawa, Ryuichi Kurakake, Masateru Minami, Hiroyuki Morikawa, Tomonori Aoyama, Information Processing Society of Japan Research Report, UBI-9(9) November 2005.

Non-patent Reference 3: "*Sensa sochakubasho wo koryo shia 3 jiku kasokudo sensa wo mochiita shiseisuitei shuho* (User Posture and Movement Estimation Based on 3-Axis Acceleration Sensor Position on the User's Body)" by Hisashi Kurasawa, Yoshihiro Kawahara, Hiroyuki Morikawa, Tomonori Aoyama, Information Processing Society of Japan Research Report, UBI-11-3 May 2006.

Non-patent Reference 4: "*Jiritsubunsangata okunai sokui sisutemu no jisso to hyoka* (Implementation and Evaluation of a Distributed Ultrasonic Positioning System)" by Kazuki Hirasawa, Masateru Minami, Shigeaki Yokoyama, Moriyuki Mizumachi, Hiroyuki Morikawa, Tomonori Aoyama, Information Processing Society of Japan Research Report, MoMuC2004-3, May 2004.

In addition, as a method for detecting an abnormal point by the sensor 401, the following techniques are possible: on an expressway, for example, it is possible to detect a point at which a traffic jam or accident has occurred; when the target is human, a change in physical conditions can be detected by a biologic sensor (pulse, breathing, and so on); and, in buildings and cars, an intruder can be detected by installing infrared sensors or pressure sensors on doors and windows.

For a method of detecting an abnormal point, the detection of a place in which a traffic jam or accident has occurred shall be given as a specific example. First, the traffic volume of vehicles is observed as needed by measuring the number of passing vehicles per hour using a vehicle detection system or the like. Then, with the abnormal traffic volume of vehicles being predefined, the measuring site in the vehicle detection system at which the defined abnormal traffic volume of vehicles has been observed is detected as an abnormal point.

Note that, although FIG. 5 illustrates the case where the sensor 401 is built in the camera 101, it is also possible, as shown in FIG. 2, to have a structure in which information on the object 104 or the abnormal point detected by the exterior sensor installed in the area to be monitored is obtained via the communication network 102 and used.

In addition, each camera has a communication interface 403 for transmitting, via the communication network 102 such as an Ethernet, video data to the surveillance monitor 103 and reciprocally exchanging control signals with a neighboring camera 101N.

Furthermore, the camera 101 includes: a collaboration parameter storage unit 404, a neighboring camera information storage unit 405, a collaboration partner selecting unit 406, a collaborating operation executing unit 407, an autonomous operation executing unit 408, a transmission band estimating unit 409, a target code amount determining unit 410, and a video encoding unit 411.

The collaboration parameter storage unit 404 is a storage unit such as memory, which stores a collaboration parameter indicating the relative level of the target code amount that is a target value for video encoding assigned to the neighboring camera 101N, which is a camera predetermined as a camera located closer to the camera from among plural cameras, and the target code amount assigned to the camera. That is, the unit 404 is a storage unit which stores the collaboration parameter (u, v) for adjusting the relationship between the code amount for the camera and the code amount for its neighboring camera.

The neighboring camera information storage unit 405 is a storage unit, such as memory, in which the camera identification information, the position information, the collaboration parameter $(u_n, v_n)$, and the target code amount for a camera selected by the collaboration partner selecting unit 406 are stored out of identification information (for example, camera IDs), position information, collaboration parameter $(u_n, v_n)$, and target code amounts Qn on other cameras, which are obtained via the communication network 102.

As a method for identifying the installation position of each camera, it is possible to obtain the position coordinate of each camera by using an apparatus such as a GPS.

In addition, as described in the above Non-patent Reference 4, each camera may prepare information on their relative position and use the relative position information by measuring the distant relationship with its neighboring camera using an ultrasonic sensor or the like.

The collaboration partner selecting unit 406 is a processing unit which selects, from among plural cameras, a camera 101N capturing the neighborhood.

Note that the neighboring camera 101N selected by the collaboration partner selecting unit 406 is predetermined based on the position of the camera.

In addition, based on the position information on each camera 101, the collaboration partner may also be determined on the side of the camera 101 according to the environment in which the camera is installed and the position of the camera, by, for example, selecting its neighboring camera 101N, as a collaboration partner, that is present within a certain distance range from the camera 101.

Thus, even when the installation position of the camera is changed or when a new camera is added, the communication partner can be automatically determined.

The collaborating operation executing unit 407 is a processing unit which determines the amount of increase and decrease of the collaboration parameter (u, v) involved in the collaborating operation of the camera 101 and the neighboring camera 101N. The collaborating operation executing unit 407 adjusts the values of the collaboration parameter (u, v) of the camera 101 so that the values become the same as the values of the collaboration parameter $(u_n, v_n)$ of the neighboring camera 101N.

In addition, the autonomous operation executing unit 408 is a processing apparatus which determines the amount of increase and decrease of the collaboration parameter (u, v) based on the autonomous operation of the camera 101, and adjusts the values of the collaboration parameter (u, v) based on its own collaboration parameter (u, v).

The collaboration parameter updating unit 413 includes the autonomous operation executing unit 408 and the collaborating operation executing unit 407 and updates the values of the collaboration parameter of the camera 101. At this time, the collaboration parameter updating unit 413 updates the collaboration parameter stored in the collaboration parameter storage unit 404, based on the position of the object detected by the sensor 401 or the like, as well as the position identification information and the collaboration parameter of the neighboring cameras stored in the neighboring camera information storage unit 405, so that: (i) the distribution pattern, which indicates the distribution of the values of the collaboration parameter in the space in which the plural cameras are present, forms a concentric circle having the object or the abnormal point detected by the sensor 401 as the origin, and that (ii) the target code amount for the camera capturing the object or the abnormal point becomes larger than the target code amount for the cameras not capturing the object or the abnormal point.

In addition, the amount of increase and decrease of the collaboration parameter (u, v) adjusted by the collaboration parameter updating unit 413 is determined based on the reaction-diffusion equations shown in Equation 2 below.

Note that collaborating operation in the collaborating operation executing unit 407 is determined by the diffusion term shown in the second term on the right-hand side of Equation 2. In addition, autonomous operation in the autonomous operation executing unit 408 is determined by the reaction term shown in the first term on the right-hand side of Equation 2.

[Expression 2]

$$\begin{cases} \dfrac{\partial u}{\partial t} = f(u, v, s) + D_u(s)\nabla^2 u \\ \dfrac{\partial v}{\partial t} = g(u, v, s) + D_v(s)\nabla^2 v \end{cases} \quad \text{(Equation 2)}$$

In Equation 2, s is sensor information transmitted from the sensor 401 and a value that is determined based on the presence or absence, the moving speed, and the moving direction of the object.

Du(s) and Dv(s) are functions for determining the value of the diffusion coefficient and adjusting the amount of increase and decrease of the collaboration parameter (u, v), which is exchanged between neighboring cameras based on the value of the sensor information s.

f(u, v, s) and g(u, v, s) are reaction terms and functions for adjusting the amount of increase and decrease of the collaboration parameter (u, v) according to the collaboration parameter (u, v) and the sensor information s. In the first embodiment, the following Equation 3 is used for reaction terms f(u, v, s) and g(u, v, s).

[Expression 3]

$$\begin{cases} f(u, v, s) = au + bv + c - du + S_u(s) \\ g(u, v, s) = eu - fv + g + S_v(s) \end{cases} \quad \text{(Equation 3)}$$

In Equation 3, Su(s) and Sv(s) are functions for determining the amount of increase and decrease of the values of the collaboration parameter (u, v) according to the values in the sensor information s. a to g are coefficients.

The transmission band estimating unit is a processing apparatus which measures the amount of traffic for the communication network 102 and estimates a free space r of the transmission band available for transmitting encoded vides to the surveillance monitor 103.

As a method of obtaining the transmission band, the transmission band can be estimated by: the pathchar method (see Non-patent Reference 5) for measuring round-trip propagation delay time (RTT: Round Trip Time) with each router by causing $n^{th}$ router on the path to send a TTL Expired message of the Internet Control Message Protocol (ICMP) packet by transmitting the packet with its Time To Live (TTL) field set as n, and estimating the band from the RTT data through statistical processing; and the pair packet method (see Non-patent Reference 6) for successively transmitting packets for band estimation to the receiving terminal and calculating the bottleneck-link band from the inter-packet transmission interval, which occurs when the packets for band estimation pass through the bottleneck link, and the packet size.

Non-patent Reference 5: A. B. Downey et al., "Using pathchar to estimate Internet link characteristics", ACM SIGCOMM'99

Non-patent Reference 6: R. L. Carter et al., "Measuring Bottleneck Link Speed in Packet-Switched Networks," Technical Report BU-CS-96-006, Computer Science Department, Boston University, March 1996.

Based on the values of the collaboration parameter (u, v) stored in the collaboration parameter storage unit 404, the values of the collaboration parameter of the neighboring camera ($u_n$, $v_n$) stored in the neighboring camera information storage unit 405, and the transmission band r obtained by the transmission band estimating unit 409, the target code amount determining unit 410 sets the target code amount to be assigned to the camera, and further, calculates the quantization step size (QSTEP) and the frame rate within the coding frame in order to achieve the target code amount Q.

Note that in an encoding method such as MPEG, the methods for controlling the code amount with respect to each coding macroblock are standardized, and the quantization step size can be derived by setting the target code amount with respect to each coding frame, so that the target code amount is achieved (For example, see Non-patent Reference 7).

Non-patent Reference 7: J. R. Corbera, S. Lei "Rate Control in DCT Video Coding for Low-Delay Communications", "IEEE Transactions on Circuits and Systems for Video Technology, Vol. 9, No. 1, pp. 172-185, February 1999."

In addition, in order to attain the target code amount Q, it is also possible to change which of the quantization step size (QSTEP) and the frame rate according to the situation should be preferentially adjusted.

For example, in the case where priority is given to image quality, the code amount is adjusted preferentially according to the frame rate, and thereby code amounts can be adjusted while maintaining image quality with respect to each frame. In addition, in order to increase the ability to trace the movement of the object, the code amount is adjusted preferentially according to the quantization step size (QSTEP), and thereby the code amount can be adjusted without lowering the frame rate.

In addition, as a method for making the code amount for an encoder closer to the target code amount Q, the code amount may be adjusted by, other than quantization step (QSTEP) and frame rate, changing the image size of a distributed video, deleting color information, changing the encoding method, and so on.

The video encoding unit 411 is an encoder which encodes videos so that the code amount generated by encoding becomes the target code amount determined in the target code amount determining unit 410. In the present embodiment, the video encoding unit 411 is an encoder which encodes the video captured in the video capturing unit 402 in the encoding methods such as Motion JPEG and MPEG with quantization step size (QSTEP) and the frame rate determined in the target code amount determining unit 410, and distributes the video with the target code amount Q.

Note that in the first embodiment, since it is assumed that videos are distributed via the communication network 102, the encoder is assumed to encode the video at a constant bit rate (CBR). Note that when recording captured video onto a medium such as a hard disk drive, the video may be encoded at a variable bit rate (VBR) in order to improve utilization efficiency of the medium.

An image processing unit 412 is an image processing apparatus which detects the presence and the movement of the object 104 from the video captured by the video capturing unit 402.

As a method for detecting the presence of the object 104 from the captured video, the detection can be achieved by using a background subtraction method, a frame difference method (see Non-patent Reference 8), and so on with respect to the video captured by the camera 101. In addition, the movement of the object 104 can also be detected by obtaining optical flow (see Non-patent References 6 and 9) and so on with respect to the captured video.

Non-patent Reference 8: "*Head Finder: furehmukan sabun wo behsu ni shia jinbutsu tsuiseki* (A Person Tracking System Based on Frame Difference)" by Naruatsu Baba, Tsuyoshi Ohashi, Tsukasa Noma, Hideaki Matsuo, Toshiaki Ejima, Symposium on sensing via Image Information 2000, pp 329-334, 2000.

Non-patent Reference 9: "Performance of optical flow techniques" by 3. L. Barron, D. 3. Fleet, S. S. Beauchemin, and T. A. Burkitt, CVPR, pp. 236-242, 1992.

Next, the operation of the camera 101 shall be described.

Figure 6:
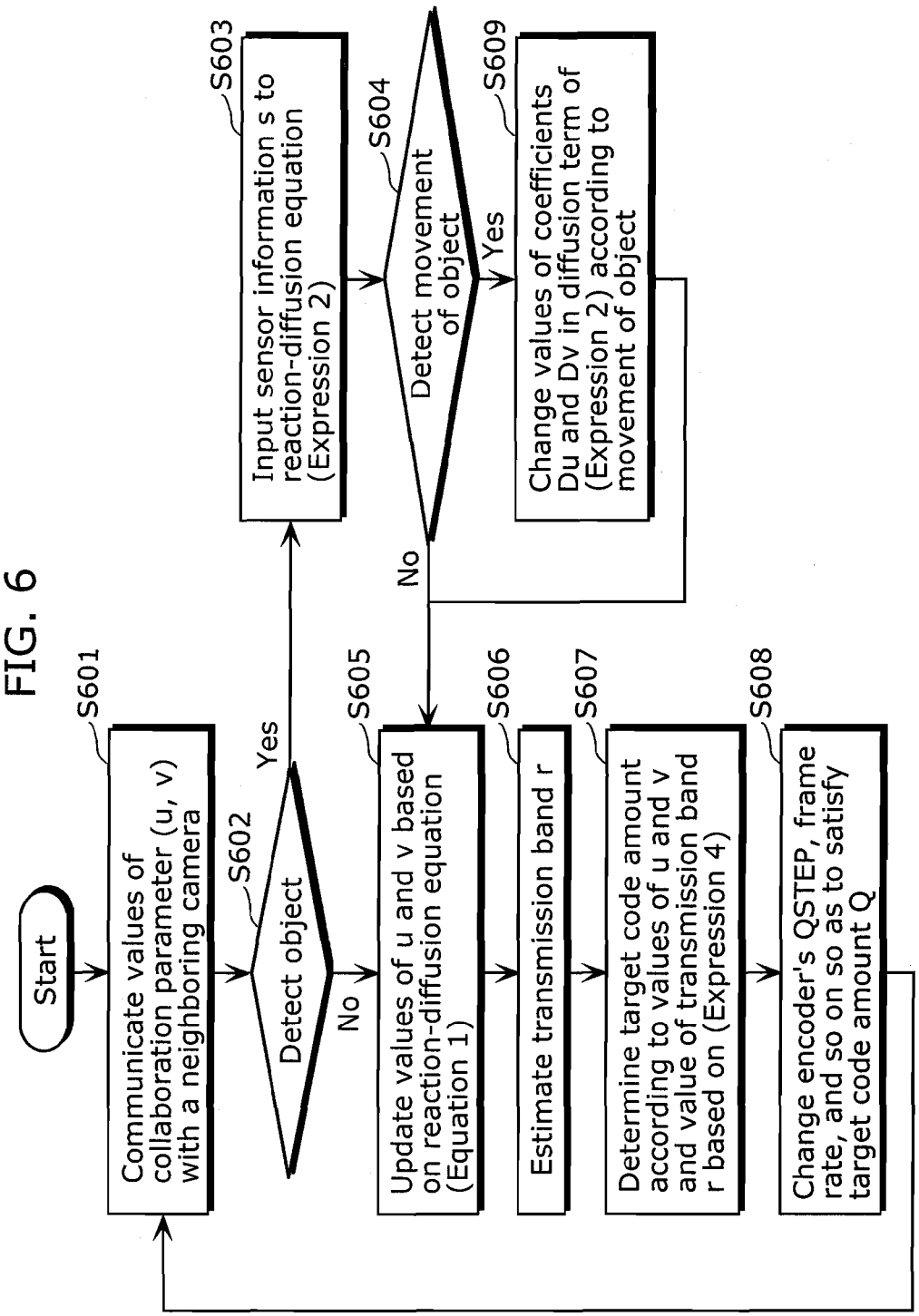
FIG. 6 is a flowchart showing the operation of the camera in the first embodiment.

FIG. 6 is a flowchart describing the adjustment operation for adjusting the target coding rate of the camera 101 in FIG. 5. Note that the flowchart shall be described by giving an exemplary case where the cameras 101 making up the monitoring system are arranged like a lattice as shown in FIG. 3.

(Step S601: Communication with a Neighboring Camera)

The camera 101 communicates its collaboration parameter (u, v) with the neighboring camera 101N via the communication network 102.

FIG. 7 is a diagram showing an example of the content of the data that the cameras 101 and the neighboring camera 101N communicate with each other. As shown in FIG. 7, the data communicated between cameras includes: camera ID for identifying each camera; position information ("position identification information") on the position at which the camera is installed (or at which the capturing is performed); and the value of the target code amount Q for the current camera, which is determined by the collaboration parameter (u, v) and the processing described later.

Subsequently, in the collaboration partner selecting unit 406, the camera that is to be the partner of collaboration is selected based on the camera ID and the position information in the transmitted data, and stored in the neighboring camera information storage unit 405.

(Step S602: Detecting an Object)

The sensor 401 or the image processing unit 412 detects the presence of the object 104.

Note that in the case where plural objects 104 are present in distant places, the distribution pattern of the collaboration parameter (u, v), having the position of each of the objects 104 as the origin, may be formed in the manner described below, and then the target code amount Q may be assigned to each camera according to the position of each of the objects 104.

In addition, in the case where the objects 104 are present in a cluster with a distance between each of the objects 104 being within a given distance, the distribution pattern of the collaboration parameter (u, v), having barycentric coordinates or the like of the position of the clustered objects 104 as the origin, may be formed in the manner described later. With this, the respective objects 104 that are present in a cluster can be treated as a group.

(Step S603)

In the case where the presence of the object is detected (Yes in Step S602), the sensor information s is transmitted to the autonomous operation executing unit 408, and the values of Su(s) and Sv(s) in Equation 3 are changed.

Here, it is assumed that the value of the collaboration parameter u of the camera detecting the object is increased by only a given amount according to Su(s) and Sv(s).

(Step S604: Detecting the Movement of the Object)

The sensor 401 and the image processing unit 412 detect the moving direction and moving speed of the object 104.

When the moving direction and the moving speed of the object 104 are detected (Yes in Step S604), the sensor 401 or the image processing unit 412 notifies the information to the collaborating operation executing unit 407.

Next, the operation flow of the case where the movement of the object is not detected (No in Step S602) shall be described first.

(Step S605: Forming the Distribution Pattern)

The collaboration parameter updating unit 413, which includes the collaborating operation executing unit 407 and the autonomous operation executing unit 408, determines the collaboration parameter (u, v) according to the position of each camera by adjusting the values of the collaboration parameter (u, v) of the camera 101 based on Equations 2 and 3, and, as a result, forms distribution patterns of the collaboration parameter (u, v) with respect to the plural cameras 101.

FIG. 8 is a diagram showing an example of a spatial distribution pattern of the value of the collaboration parameter u, which is generated according to Equations 2 and 3.

In FIG. 3(b), an exemplary case where cells are arranged one-dimensionally is given so as to describe the formation of a distribution pattern in which the concentrations of the activator and the inhibitor (u, v) are uneven. However, in FIGS. 8(a) to 8(c), in the case where an infinite number of cameras are arranged on a two-dimensional plane surface, the region in which the collaboration parameter u held by each of the cameras becomes relatively large and the region in which the collaboration parameter u held by each of the cameras becomes relatively small are shown in two colors, that is, black and white, respectively.

For example, as shown in FIG. 8(a), by setting the values of coefficients in Equations 2 and 3 as: a=0.1, b=−0.06, c=0.0, d=0.05, e=0.05, f=0.1, g=−0.1, Du(s)=0.01, and Dv(s)=0.01, a distribution pattern referred to as "bistable" is formed in which the value of the collaboration parameter u of a camera located closer to the presence of the object 104 becomes larger, and the value u becomes smaller for cameras in other places.

In addition, as shown in FIG. 8(b), by setting the values of coefficients in Equations 2 and 3 as: a=0.08, b=−0.08, c=0.04, d=0.03, e=0.01, f=0.06, g=−0.15, Du(s)=0.02, and Dv(s)= 0.5, a distribution pattern referred to as "spot" is formed in which regions having large values of the collaboration parameter u and regions having small values of collaboration parameter u are alternately formed, with the position of the object 104 being the origin.

Furthermore, as shown in FIG. 8(c), by setting the values of coefficients in Equations 2 and 3 as: a=0.08, b=−0.08, c=0.04, d=0.03, e=0.06, f=0.03, g=−0.15, Du(s)=0.01, and Dv(s)= 0.25, a distribution pattern referred to as a "pulse train" is formed in which a pattern of regions having large values of the collaboration parameter u and regions having small values of the collaboration parameter u, which are alternately formed in a concentric state with the position of the object 104 being the origin, moves dynamically from the origin.

(Step S606)

The transmission band estimating unit 409 obtains the free space r of the transmission band that is available in the communication network 102.

(Step S607)

The target code amount determining unit 410 calculates the target code mount Q according to Equation 4 below, using the collaboration parameter stored in the collaboration parameter storage unit 404, the neighboring camera collaboration parameter $(u_n, v_n)$ stored in the neighboring camera information storage unit 405, the target code mount $Q_n$ of the neighboring camera 101N stored in the target code mount determining unit 410 in the neighboring camera, and the value of the available space of transmission band r that is obtained by the transmission band estimating unit 409. However, $u_n$ and $v_n$ are assemblies $u_n$=(u1, u2, u3, . . . , uN) and $v_n$=(v1, v2, v3, vN). In addition, Qn is an assembly $Q_n$=(Q1, Q2, Q3, . . . , QN) of the target code amount for the neighboring camera 101N.

(Expression 4)

$$Q=h(u,v,u_n,v_n,Q_n)*I(r) \quad \text{(Equation 4)}$$

Note that, in Equation 4, $h(u, v, u_n, v_n, Q_n)$ is a function for determining the target code amount Q for the camera 101 with respect to the neighboring camera 101N, based on the collaboration parameter (u, v) of the camera 101, and the collaboration parameter ($u_n$, $v_n$) of the neighboring camera 101N, and the value of the target code amount $Q_n$ for the neighboring camera 101N.

In addition, I(r) is a function for adjusting the absolute amount of the target code amount Q by decreasing the target code amount Q when the communication network is busy, and increasing the target code amount Q when the communication network 102 is available. For an example of I(r), the following Equation 5 is used.

(Expression 5)

$$I(r) = I_0 + \alpha \int (r_t - r(t)) dt \quad \text{(Equation 5)}$$

Note that
in Equation 5, $I_0$ is the initial value for I(r). In addition, $r_t$ is the target value for the free space in the transmission band, and r(t) is the free space in the transmission band at time t. a is a coefficient. Equation 5 shows a function I(r) for adjusting the value of I so that the difference between the free space r in the transmission band measured at time t and the target value for the free space $r_t$ becomes smaller. In other words, the function I(r) works so that the value of I becomes larger when the actual free space r is larger than the target value for the free space in the transmission band $r_t$, and so that, on the contrary, the value of I becomes smaller when the actual free space is larger than the target value for the free space in the transmission band $r_t$.

For example, when the target value for the free space in the transmission band $r_t$ is set to be 20% of the total amount of the transmission band, the value of I(r) is adjusted, according to Equation 5, so that the amount of free space in the transmission band r approaches 20% of the total amount of the transmission band.

Next, an example of the function h(u, v, $U_n$, $V_n$, $Q_n$) is shown in Equation 6 below.

(Expression 6)

$$h(u, v, u_n, v_n, Q_n) = \frac{1}{N} \sum_i^N \frac{u_{n_i}}{u} Q_{n_i} \quad \text{(Equation 6)}$$

In Equation 6, N is the number of neighboring cameras 101N with which each camera exchanges its collaboration parameter (u, v)

Each camera 101 adjusts the target code amount Q according to Equation 6 so that the value of the target code amount Q for the camera 101 with respect to the target code amount $Q_n$ for each of the neighboring cameras 101N becomes equal to the average of the value of the collaboration parameter u of the camera 101 and the ratio of the collaboration parameter $u_n$ of the neighboring cameras 101N.

FIG. 9(a) and FIG. 9(b) are a diagram describing, in the case where the distribution pattern of the collaboration parameter u of each camera 101 is in a "bistable" state, how the distribution pattern of the target code amount Q for each camera 101 is made to approximate the distribution pattern of the "bistable" type according to Equation 6.

FIG. 9(a) shows the pattern of distribution of regions having large values of collaboration parameter u in three kinds of patterns according to the largeness of values (large, medium, and small) of the collaboration parameter u when the distribution pattern of the collaboration parameter u of each camera 101 is bistable (See FIG. 8(a)). In addition, FIG. 9(b) shows the change of the value of the target code amount Q for each camera 101, which is located in the same place as in FIG. 9(a), in three kinds of patterns according to the largeness of the target code amount Q (large, medium, and small).

When, due to the reciprocal action of the neighboring camera, the distribution pattern of the collaboration parameter (u, v) is a distribution pattern as shown in FIG. 9(a), and when the distribution pattern of the target code amount Q is in the state as shown in FIG. 9(b-1), each camera 101 automatically adjusts the target code amount Q according to Equation 6 so that the ratio between the target code amount Q for the camera and the target code amount $Q_n$ for the neighboring camera attains the ratio ($u:u_n$) between their respective values of the collaboration parameter.

In this manner, since in each camera 101, the ratio between the target code amount Q and the target code amount Qn is made closer to the ratio of ($u:u_n$), it is possible, as sown in FIG. 9(b-2), to make the distribution pattern of the target code amount Q closer to the distribution pattern in FIG. 9(a).

Figure 10:
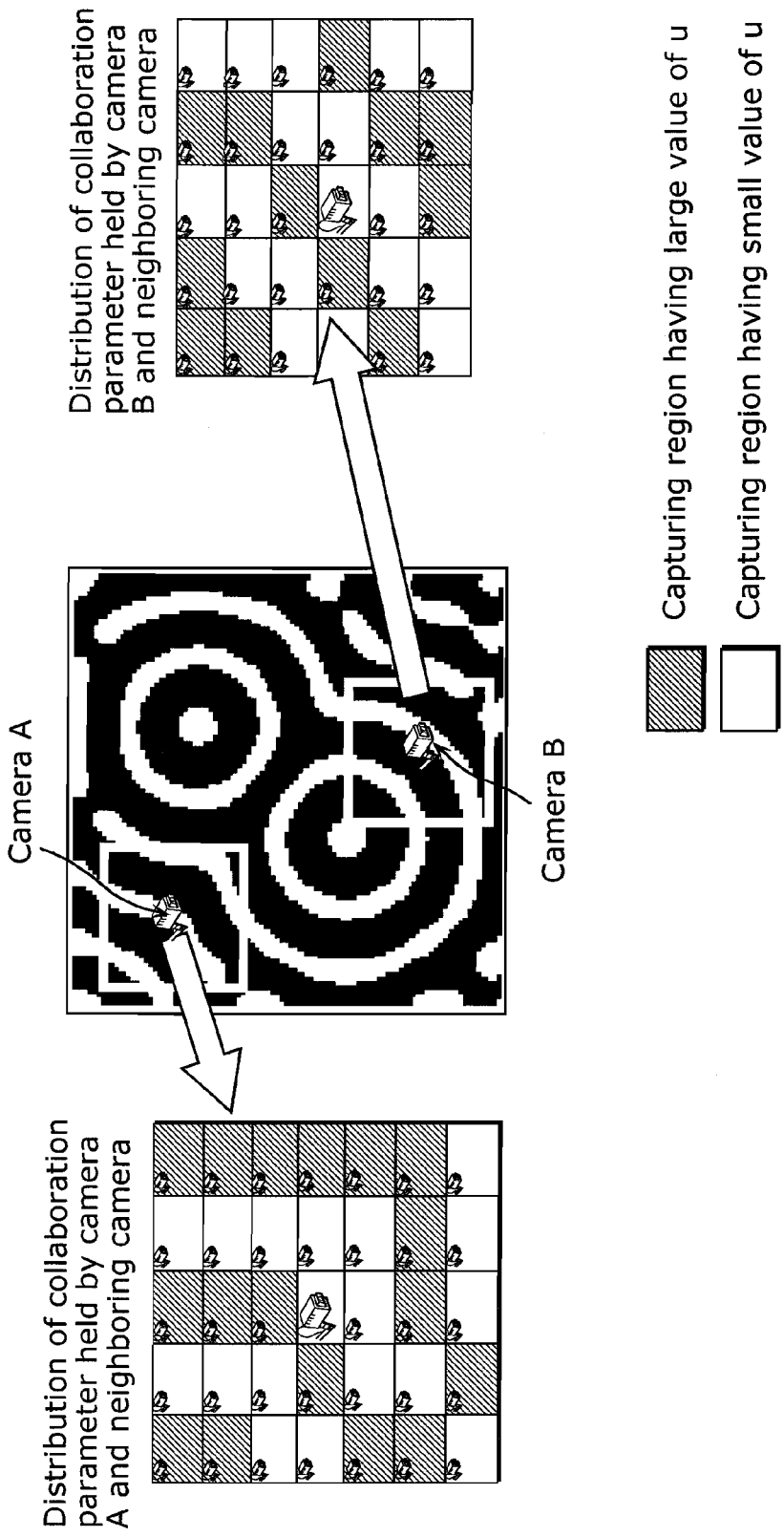
FIG. 10 is a diagram describing the operation of the cameras (an example of the distribution of the collaboration parameter) in the first embodiment.

In addition, in the case where the collaboration parameter u shows, as shown in FIG. 8(b), a "spot"-type distribution pattern having the position of the object as the origin, the distribution of the collaboration parameter u of the neighboring camera comes to have a pattern of circular stripes having the position of the object as the origin as shown in FIG. 10. With this, each camera having a large code amount and each camera having a small code amount can be assigned at a given distance. In addition, it is possible to change the interval and the width of the stripes in FIG. 8(b) by adjusting the values of the respective coefficients in Equations 2 and 3. Therefore, by changing the interval and width of the stripes, it is possible to automatically adjust the number and the density of cameras which should be assigned with a large code amount.

In addition, when using a distribution pattern in which the distribution changes dynamically, such as the "pulse-train" type shown in FIG. 8(c), the region having a high collaboration parameter u propagates like spreading from the position of the object as the origin into the whole area to be monitored, thereby assigning a large target code amount Q, dynamically and periodically, to all the areas to be monitored.

This allows an automatic assignment of code amounts to respective cameras so that all the areas to be monitored are captured with a large target code amount Q within a given time.

In addition, as another method for determining the code amount Q, the target code amount Q for the camera may be determined not only by the values of the collaboration parameter (u, v), but also by the geometric features of the distribution pattern.

For example, as shown in FIG. 10, a pattern of stripes always makes a curve (arc) towards the object, and the curve becomes larger as the distance from the position of the object becomes larger. Therefore, the distance and the direction towards the object can be estimated based on the largeness of the curve (arc) of the stripes. In other words, the target code amount determining unit 410 may specify, in the distribution pattern of the collaboration parameter updated in the collaboration parameter updating unit 413, the curvature of the arc in the region in which the camera is present, and may determine the target code amount for the camera so that the target code amount becomes larger as the determined curvature is larger.

Here, for example, template matching can be given as a specific method for estimating the distance and the direction with respect to the subject based on the largeness of the curve (arc) of the stripes. In template matching, the distribution pattern of the collaboration parameter (u, v), which is formed in advance with the object as the origin, is stored as template information together with the direction k and distance I from the subject for each given direction k and given distance I from the object as the origin. Then, the template information, which is the closest in shape to the distribution pattern that is actually formed surrounding the camera, is selected by template matching. Subsequently, the direction k and the distance I of the object can be specified according to the details described in the selected template information.

When the direction k and the distance I towards the object can be specified, the target code amount Q can be determined by using the function, for example, as shown in Equation 7 below.

(Expression 7)

$$Q=J(\vec{k},l)*I(r) \quad \text{(Equation 7)}$$

In Equation 7, I(r) is a function described in Equation 5. In addition, 3(k, l) is a function in which the direction k and the distance l toward the object are assumed as variables. For example, by using a function as shown in Equation 8 below, the value of the target code amount Q can be made smaller as the distance from the object becomes larger, with the position of the object being as the origin.

(Expression 8)

$$J(\vec{k},l) = \frac{1}{\sqrt{2}\pi} \exp\left(-\frac{l^2}{2\delta^2}\right) \quad \text{(Equation 8)}$$

Note that Equation 8 is a function drawing the Gaussian distribution with the position of the object being the origin.

Thus, it is possible to assign the target code amount Q based on the direction k and the distance l of the object that are estimated based on the geometric features of the distribution pattern of the collaboration parameter (u, v).

In addition, like the "pulse-train" distribution pattern shown in FIG. 8(c), the target code amount Q may be adjusted by identifying the position of the object based on the geometric features of the distribution pattern that is dynamically changing.

For example, in the "pulse-train" distribution pattern, it is possible to obtain the moving direction of the stripes from changing difference information on the parameter (u, v), and to estimate from the camera 101, the direction in which the object is present.

In addition, in the case where the entire region to be monitored cannot be captured due to a small number of cameras or in the case where the installation density of cameras differs from place to place according to the level of importance in monitoring, the spatial resolution of the distribution pattern of the collaboration parameter (u, v) of each camera becomes low and unsuitable for assignment of the target code amount Q.

Therefore, with respect to the camera having a small number and density of neighboring cameras 101N, assuming that a virtual camera is installed around the camera, the increase and decrease of the collaboration parameter ($u_n$, $v_n$) and the target code amount $Q_n$ for the virtual camera are calculated in the same manner as the target code amount Q, and these values are used for the assignment of the target code amount Q. With this, the spatial resolution of the distribution pattern of the collaboration parameter (u, v) can be virtually improved.

In addition, the collaboration parameter ($u_n$, $v_n$) and the target code amount $Q_n$ for the virtual camera and a neighboring camera 101N may be reciprocally communicated and used. With this, when the camera 101 determines the target code amount Q, the collaboration parameter ($u_n$, $v_n$) and the target code amount $Q_n$ for the virtual camera, which is calculated by another camera 101, can be used, thereby offsetting the shortage in number and density of the neighboring cameras more efficiently.

In addition, in the case where, as a result of using a wide angle camera, the surface area of the video capturing region per camera becomes larger and the installation density of cameras becomes smaller, the video capturing region of the camera 101 may be divided into plural regions, and virtual cameras may be installed in each of the divided region; thereby assigning different values of the collaboration parameter (u, v) to the respective areas within the capturing region of the camera 101. With this, even in the case where the video capturing region of the camera 101 is wide and the installation density of the camera 101 is lower, the spatial resolution of the distribution pattern of the collaboration parameter (u, v) can be improved.

In addition, as data for determining the condition of the virtual camera, the data having the same details as the data described in FIG. 7 is used. Such data of the virtual camera is stored in the neighboring camera information storage unit 405.

Note that although the description in the first embodiment has centered on the method of determining the target code amount Q by using only the distribution pattern of the collaboration parameter u, it is also possible to design the values of reaction terms f(u, v, s) and g(u, v, s) and values of the diffusion coefficients Du(s) and Dv(s) and determine the target code amount Q using v and the combination (u, v) so that the distribution pattern of the collaboration parameter v or the distribution pattern of a combination of both values of the collaboration parameter (u, v) has a shape of "bistable," "spot," or the like.

(Step S608: Determining Quantization Parameter)

The target code amount determining unit 410, when the target code amount Q is determined as described earlier, determines the quantization step size (QSTEP) and the frame rate value of the encoder so that the code amount for the video approximates the target code amount Q.

The video encoding unit 411 encodes the video transmitted from the video capturing unit 402 according to the parameter determined in the target code amount determining unit 410 and transmits the encoded video to the surveillance monitor 103 via the communication interface 403 and the communication network 102.

Next, the case where the movement of the object is detected (Yes in Step S604) shall be described.

(Step S609)

When the moving direction and moving speed of the object is detected by the sensor 401 and so on (Yes in Step S604), information regarding the detected behavior of the object is transmitted to the collaborating operation executing unit 407, and the values of the diffusion coefficients Du(s) and Dv(s) are changed.

Figure 11:
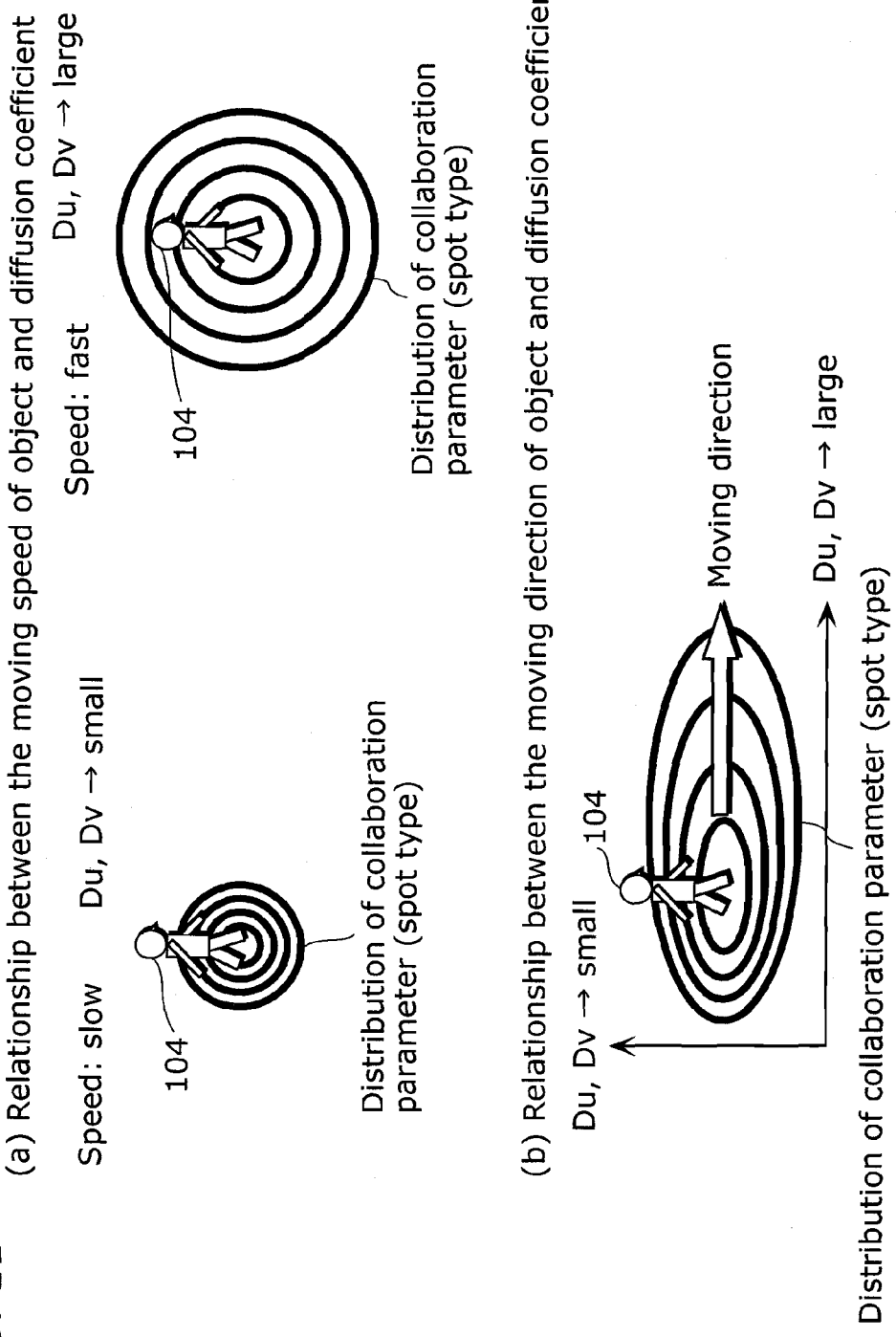
FIG. 11(a) and (b) are a diagram describing the operation of the cameras in the first embodiment.

FIG. 11 is a diagram illustrating changes in diffusion coefficients Du(s) and DV(S) with respect to the behavior of the object, as well as the changing situation of the distribution pattern of the collaboration parameter (u, v) that is formed as a result of the changes in diffusion coefficients Du(s) and Dv(s).

As FIG. 11(a) shows, the size of the distribution pattern of the collaboration parameter (u, v) can be adjusted by adjusting the size of the diffusion coefficients Du(s) and DV(s). For example, the sensor 106 detects the moving speed of the object, and the collaboration parameter updating unit 413 updates the collaboration parameter so that the intervals at which the regions having a large collaboration parameter and the regions having a small collaboration parameter alternate become larger as the moving speed of the object becomes larger.

Therefore, since the size of the distribution pattern of the collaboration parameter (u, v) can be adjusted according to the moving speed of the object by decreasing the values of coefficients Du(s) and Dv(s) when the object is moving slowly and increasing the values of coefficients Du(s) and Dv(s) when the object is moving fast, and the range and number of the cameras can be automatically adjusted to the moving speed of the object 104 so that the value of the code amount is increased.

In addition, as shown in FIG. 11(*b*), it is possible to cause the distribution pattern of the collaboration parameter (u, v) to have a bias toward the same direction as the proceeding direction of the object 104 by increasing the values of the diffusion coefficients Du(s) and Dv(s) with a neighboring camera 101N that is present, as seen form the camera, in the same direction as the moving direction of the object 104, and decreasing the values of the diffusion coefficients Du(s) and Dv(s) with respect to the other neighboring cameras 101N that are present in the other directions. That is, the sensor 106 detects the moving speed of the object, and the collaboration parameter updating unit 413 updates the collaboration parameter so that a distribution pattern in which the intervals at which the regions having a large collaboration parameter and the regions having a small collaboration parameter alternate becomes larger towards the moving direction of the object.

By thus adjusting the values of the diffusion coefficients Du(s) and Dv(s) according to the movement of the object 104, a distribution pattern is formed in which the values of the collaboration parameter (u, v) increase towards the moving direction of the object 104 to the extent according to the moving speed.

FIG. 12 is a diagram showing an example of data communicated reciprocally between each camera 101 in the case where the diffusion coefficients Du(s) and Dv(s) are adjusted according to the movement of the object 104.

By communicating the data as shown in FIG. 12(*a*), the camera, which has detected the object, adjusts the values of its own diffusion coefficients Du(s) and DV(s) based on the detected details, and can also change values of the diffusion coefficients Du(s) and Dv(s) of its neighboring camera 101N by notifying the adjusted coefficients Du(s) and Dv(s) to the neighboring camera.

In addition, when changes to the diffusion coefficients Du(s) and Dv(s) are made with all the cameras based on the movements of the plural objects, there is a case where such changes to the diffusion coefficients Du(s) and Dv(s) according to the movements of the respective objects interfere with each other, and where, as a result, the coefficients Du(s) and Dv(s) are adjusted to the values not applicable for any of the objects. In addition, when the diffusion coefficients Du(s) and Dv(s) continue to hold the same value even after the object has disappeared, the time to assign code amounts becomes longer when a new object appears that is moving in an opposite direction of the object that was present before. Therefore, as shown in FIG. 12(*b*), by notifying, at the same time, information which specifies the application range and the application time for adjusting the diffusion coefficients Du(s) and Dv(s), the range and the time for changing the diffusion coefficients may be limited.

In the example shown in FIG. 12(*b*), the range of change ("application range") for diffusion coefficients Du(s) and Dv(s) is specified to a camera that is present within a 5-meter radius around the object, and as for the time ("application time") from when the diffusion coefficients Du(s) and Dv(s) are changed till when the diffusion coefficients Du(s) and Dv(s) are returned to the initial values, an example of transmitted or received data, in the case where the time is specified as 120 seconds after the diffusion coefficients are changed, is shown. With this, the diffusion coefficients Du(s) and Dv(s) that have been changed with respect to an unnecessary camera and adjustments of the diffusion coefficients Du(s) and Dv(s) which are no longer necessary can be automatically set back to initial values.

FIG. 13 is a diagram describing the timing for the camera 101 having detected the object 104 to notify the change in diffusion coefficients Du(s) and Dv(s) to the neighboring camera.

As shown in FIG. 13, for changing the diffusion coefficients Du(s) and Dv(s), when the camera 101 detects the object 104 (Step 1), the camera changes the value of its own diffusion coefficients Du(s) and Dv(s) (Step 2), and further notifies the changed values of the diffusion coefficients Du(s) and Dv(s) to a neighboring camera A (Step 3). Likewise, the neighboring camera A, upon receiving the changed values of diffusion coefficients Du(s) and Dv(s), changes its own diffusion coefficients Du(s) and Dv(s) to the received values (Step 4), and further notifies, to a neighboring camera B, the diffusion coefficients Du(s) and Dv(s) that have been changed (Step 5). Furthermore, the values of the diffusion coefficients Du(s) and Dv(s) are changed by repeating the same process to the extent that changes to the values of the diffusion coefficients Du(s) and Dv(s) of the neighboring cameras can be applied (Steps 6 and 7).

Figure 14:
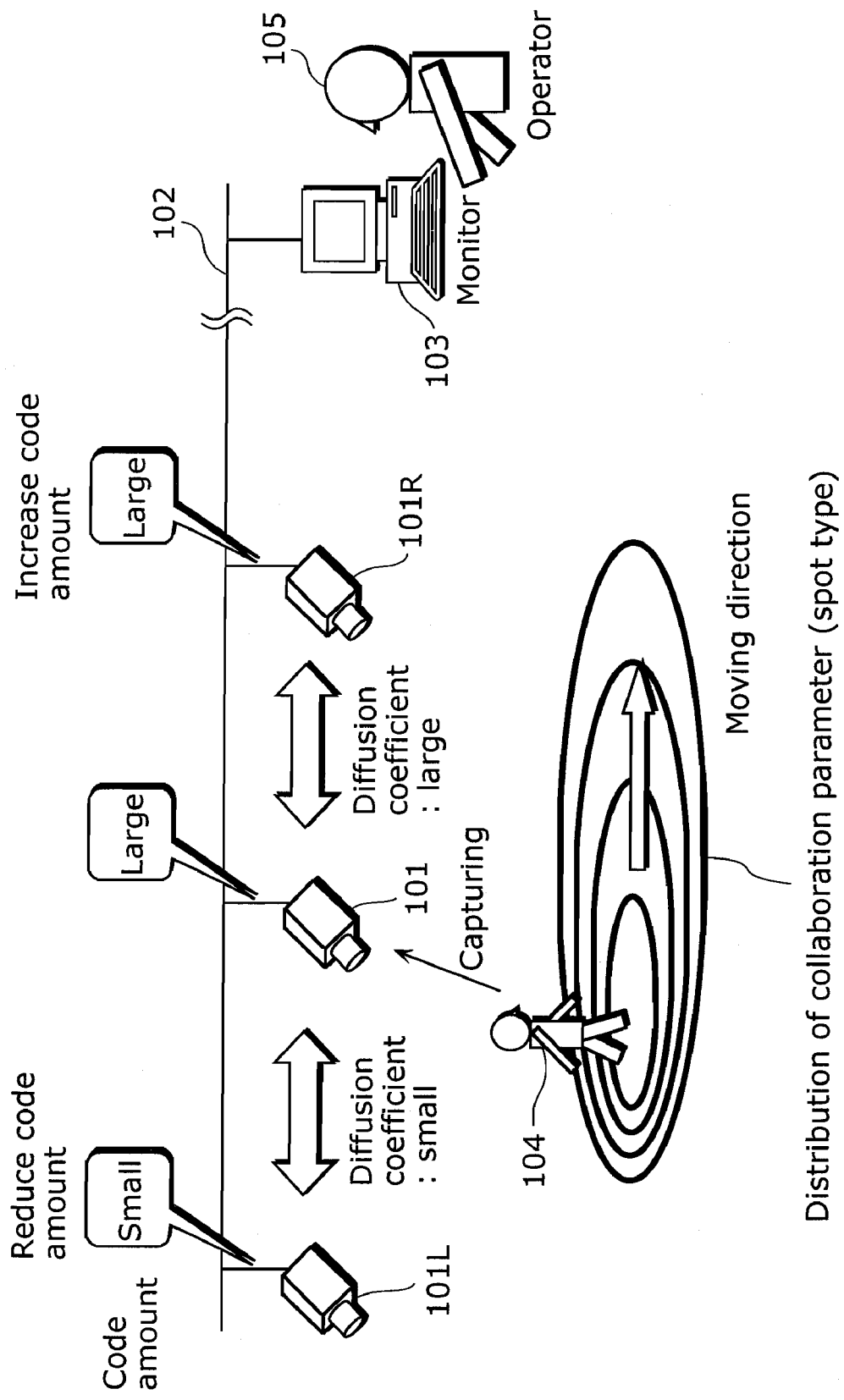
FIG. 14 is a diagram showing the operation of each camera in the first embodiment.

FIG. 14 is a diagram showing an exemplary distribution pattern of the collaboration parameter (u, v) and an exemplary assignment of the target code amount Q for each camera in the case where the diffusion coefficients Du(s) and Dv(s) are changed according to the movement of the object.

FIG. 14 shows a situation in which a distribution pattern of the collaboration parameter (u, v), which has a large bias toward the moving direction of the object, is formed by increasing the values of the diffusion coefficients Du(s) and Dv(s) with respect to a neighboring camera 101R installed in the moving direction of the object 104 whereas decreasing the values of the diffusion coefficients Du(s) and Dv(s) with respect to a camera 101L installed in a direction opposite to the moving direction of the object 104. Subsequently, adjustments are made with the respective cameras based on the distribution pattern of the collaboration parameter (u, v) that reflects the movement of the object. For example, the values of the target code amount Q for the camera 101 and the camera 101R whose neighboring space has a striped distribution pattern of the collaboration parameter (u, v) are adjusted higher whereas the values of the target code amount Q for the other cameras are adjusted lower.

Thus, with the monitoring system according to the first embodiment, the assignment of the target code amount Q, which allows a high level of ability to trace the movement of the object as well as high utilization efficiency of the transmission band, can be adjusted automatically by local collaborating operations of the plural cameras 101.

In addition, although the spatial pattern formed by the plural cameras varies according to the type of mathematical expressions and the value of each coefficient as shown in Equations 2 and 3, an operator 105 of the monitoring system may instruct these expressions, the values of coefficients, or the like to the respective cameras according to the purpose and the structure of the cameras.

Figure 15:
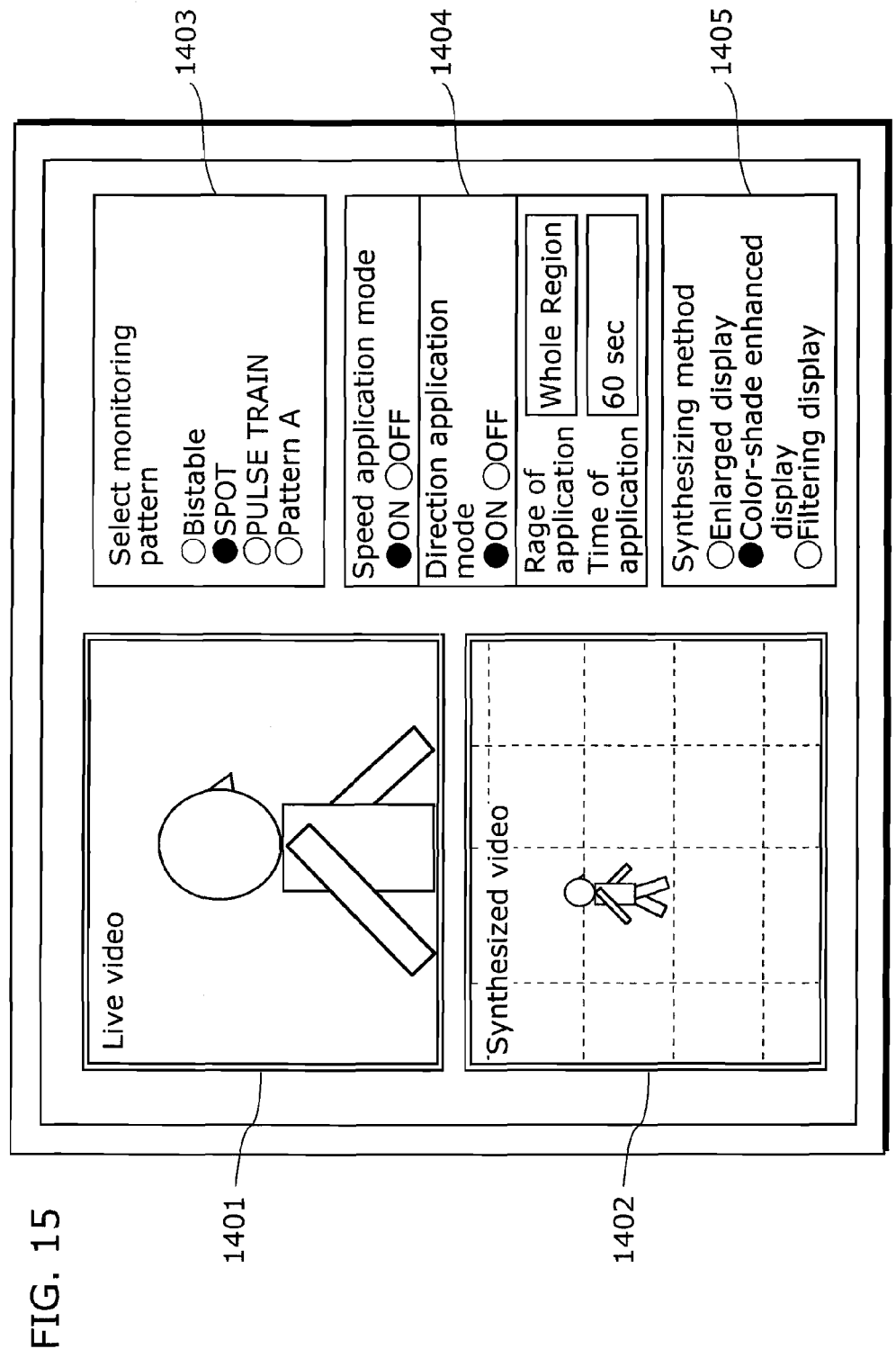
FIG. 15 is a diagram showing the operation of each camera in the first embodiment.

FIG. 15 is a diagram showing an example of a GUI on which the operator 105 gives instructions to the respective cameras 101. A synthesized video monitor 1402 and a live video monitor 1401 are display units for displaying, respectively, a video synthesized from the videos from the plural cameras and the magnified video (live video). A monitoring pattern selecting panel 1403 is an operation panel on which switches for selecting a distribution pattern of the code amount for the plural cameras are displayed. When the operator 105 selects the target spatial pattern of the code amount assignment from the monitoring pattern selecting panel 1403, the data regarding the collaboration method (mathematical expressions, coefficients, and so on) required for forming the predetermined distribution pattern of the code amount assignment is transmitted to the respective cameras 101.

Note that plural collaboration methods (mathematical expressions and coefficients) are preset in the respective cameras, and that the operator 105 may instruct the respective cameras on what collaboration method (mathematical expression and coefficients) to use.

FIG. 16(a) and FIG. 16(b) are a diagram showing an example of data in which the details of the collaboration method (mathematical expressions and coefficients) notified by the monitoring pattern selecting panel 1403 to respective cameras is described.

FIG. 16(a) shows the details of the data with which the surveillance monitor 103 notifies, to the respective cameras 101, the details of the collaboration method as mathematical expressions and coefficient values. A monitor ID is a unique ID given to each monitor so as to identify the monitor transmitting information to the plural cameras 101.

When an instruction to change the collaboration method is given from plural surveillance monitors 103, it is also possible to predetermine a preferential order for respective monitors and follow the instruction of the camera 101 having the highest preferential order. With this, even when instructions are simultaneously transmitted from the plural monitors, all the cameras can operate in accordance with an identical collaboration method. In addition, it is also possible to predetermine the preferential order for operators 105 instead of the predetermined preferential order for the surveillance monitors 103, and to use an operator ID unique to each of the operators 105 instead of the monitor ID transmitted form the monitoring pattern selecting panel 1403.

Furthermore, in FIG. 16(a), as information for determining the collaboration method, diffusion-reaction equations describing the method for adjusting the collaboration parameter (u, v) and values of the coefficients are assigned for each camera 101. In addition, FIG. 16(b) shows the details of the data transmitted from the monitoring pattern selecting panel 1403 to each camera in the case where the collaboration method is preset in each camera. A preset number shown in FIG. 16(b) is the preset number selected by the operator from among the collaboration methods that are preset in each camera.

A setting panel 1404 is an operation panel for selecting whether or not to make adjustments to the range of assignment of the code amount according to the moving speed and the moving direction of the object 104. In addition, in the case where the assignment of the code amount is adjusted in consideration of the moving speed and the moving direction, it is also possible to specify the application range within which the adjustments are made in consideration of the moving speed and the moving direction from the place in which the object is detected, and the length of application time for which the adjustments are maintained from the time at which the object is found.

A synthesis range setting panel 1405 is an operation panel on which switches are displayed for selecting a camera whose video is to be synthesized, in the case where videos from the plural cameras 101 are synthesized and displayed.

In synthesizing monitoring videos, the videos may be synthesized by specifying the region surrounding the object based on the distribution pattern of the collaboration parameter (u, v) that is assigned according to the movement of the object. With this, only the videos from the cameras assigned with large code amounts according to the movement of the object can be synthesized and displayed.

The synthesis range setting panel 1405 is a set of switches for selecting a method for synthesizing the videos in the case where videos from the plural cameras 101 are synthesized and displayed. For synthesizing monitoring videos from plural cameras into a video, it is also possible to make adjustments to the camera range and the details of video processing used for the video synthesis, based on the distribution pattern of the collaboration parameter (u, v) of each camera.

FIG. 17 is a diagram showing an example of a video synthesized from videos from plural cameras and displayed on the GUI, based on the distribution pattern of the collaboration parameter (u, v). Note that, as shown in FIG. 17(a), the case is assumed where the installation position and the code amount for each camera is assigned so that a larger code amount is assigned to a camera installed in the region in which the object is present and the surrounding regions. At this time, the surveillance monitor 103 displays the synthesized video so that, a video having the largest code amount, from among the videos transmitted from the plural cameras, has pictures of higher quality, larger size, or higher-level gradation. Alternately, the surveillance monitor 103 performs edge enhancement processing on videos having large code amounts, from among the videos transmitted from the plural cameras, and performs mosaic processing on videos having small code amounts, and displays a synthesized video after the respective processes. Hereinafter, examples of display of synthesized videos are shown in FIG. 17(b) to FIG. 17(d).

FIG. 17(b) shows a display screen image synthesized into a video by enlarging the region surrounding the object and reducing the other regions based on the distribution pattern of the collaboration parameter (u, v).

With this, since it is possible to display, in an enlarged image, the appearance of the object which requires particular attention in monitoring, the facial expressions, gestures, and so on of the object can be monitored in more detail.

Note that a video to be displayed in a reduced size should preferably be adjusted and distributed as a video of a small image size so as to have a smaller code amount. With this, the utilization efficiency of the transmission path can be improved.

In addition, other than the video magnification or reduction, the position of the object can be highlighted for the operator by displaying the surrounding regions of the object as sterically emerging as shown in FIG. 17(b).

FIG. 17(c) shows a screen display on which, based on the distribution pattern of the collaboration parameter (u, v), the surrounding regions of the object are displayed as color video (that is, images of high-level gradation), whereas the other areas are displayed as synthesized video in black and white.

With this, since the periphery of the object is displayed so as to stand out from the other regions, an effect is produced that the position of the subject can be easily identified.

Note that the video to be displayed in black and while should preferably be distributed as a video removed of color information in advance so as to have a smaller code amount. With this, the utilization efficiency of the transmission path can be improved.

In addition, other than selecting between color video and the black-and-white video, videos may also be synthesized so that the position and the air of the object can be easily identified. For example, in the case where videos from plural cameras are synthesized, hue, chroma saturation, luminosity, and so on may be changed based on the distribution pattern of the collaboration parameter (u, v) so that the regions distant from the object are shown in cold colors whereas the regions closer are shown in warm colors, or the level of gradation for the video may be changed with respect to each region.

FIG. 17(d) shows a screen display on which, based on the distribution pattern of the collaboration parameter (u, v), the images of the object and its surrounding regions are edge-enhanced through a highpass filter or the like and displayed; whereas the other regions are displayed as a synthesized image treated with mosaic processing.

With this, only the object can be clearly highlighted, whereas, for the other places, the respective videos can be automatically filtered and synthesized so as to be mosaiced in consideration of privacy, and so on.

Note that, as a filter for image processing, other than "edge enhancement" or "mosaicing," filters such as "feathering" and "texture" attachment may also be used according to an intended use.

Figure 18:
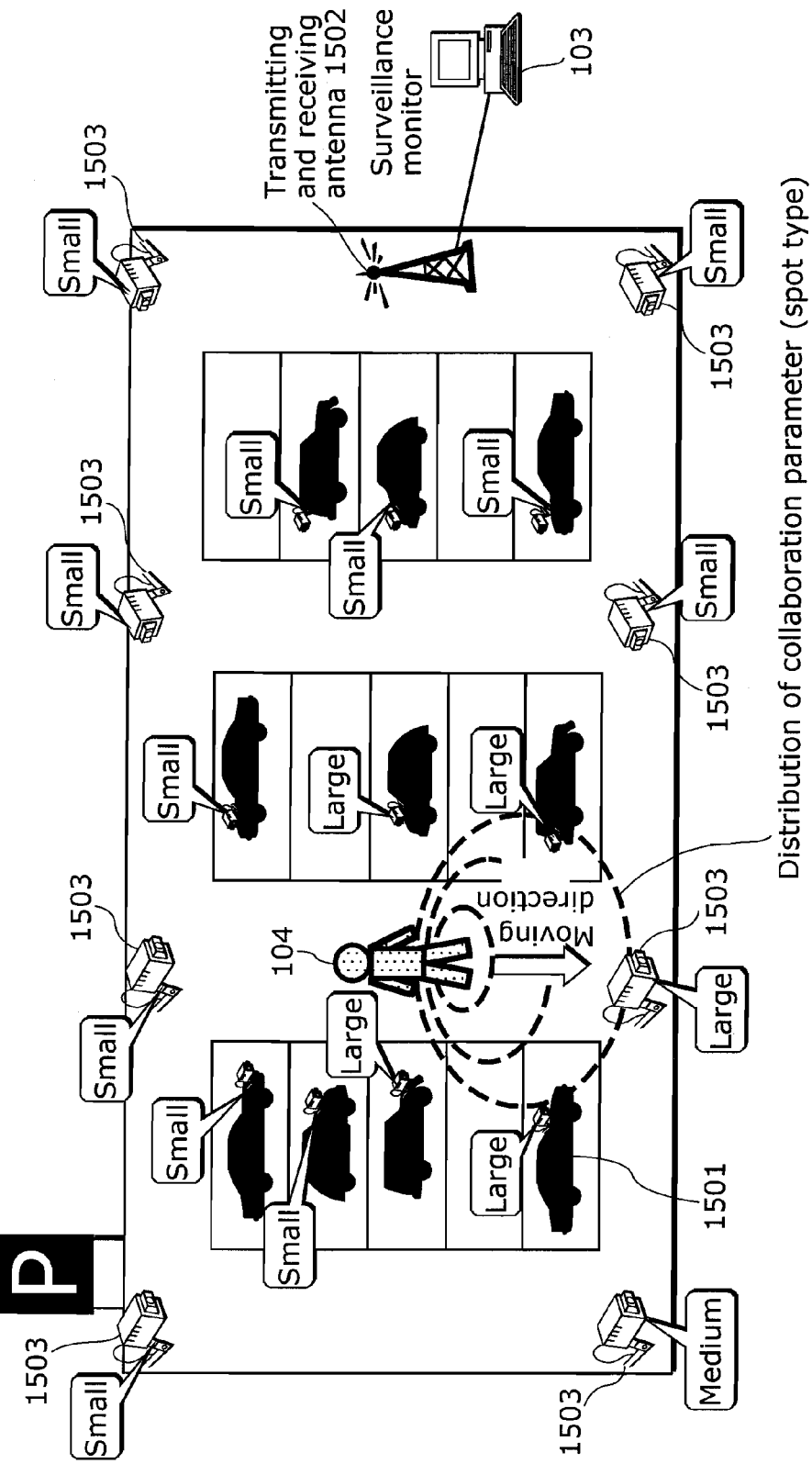
FIG. 18 is a diagram describing Embodiment 1-1 (an example of the monitoring of a parking lot with plural in-vehicle cameras) in the first embodiment.

Note that although the description in the first embodiment has been focused on a camera whose position is already fixed, a structure using a moving camera whose capturing position is changeable is also adoptable. FIG. 18 is a diagram showing an example of parking-lot monitoring with plural in-vehicle cameras using the moving camera (Embodiment 1-1).

FIG. 18 represents the structure of the monitoring system in which the plural in-vehicle cameras 1501 collaboratively capture the appearance of the object in the parking lot and distribute videos to the surveillance monitor.

In the example in FIG. 18, an in-vehicle camera 1501 equipped on each vehicle has the same structure as the camera 101 shown in FIG. 5.

In addition, for each in-vehicle camera 1501, a wireless LAN card is used as the communication interface 403 for distributing captured videos, and the videos are distributed by wireless communication.

In addition, since the position information on the in-vehicle camera differs according to the place where the vehicle is parked, each in-vehicle camera 1501 identifies its own position when the vehicle is parked in the parking lot.

As a method for allowing the in-vehicle camera 1501 to detect its own position in the parking lot, in the case of an outdoor parking lot, it is possible to identify the position by using a GPS included in a vehicle navigation system or the like.

In addition, in the case of indoors or an underground parking lot out of reach of GPS radio waves, it is possible to identify the position information by, for example, embedding a tag in which a position coordinate with respect to each parking space is stored, and reading, with a tag reader or the like, the position information embedded within the parking space.

An in-vehicle camera 1501, which has obtained its own position information, obtains the position information on the neighboring in-vehicle camera by wireless communication and selects an in-vehicle camera that is to be a collaboration partner. As a method for allowing each in-vehicle camera to determine the collaboration partner, the collaboration partner is selected according to the distance between in-vehicle cameras by, for example, selecting the in-vehicle camera of a vehicle parked within a 5-meter radius from the in-vehicle camera.

Furthermore, each vehicle has a sensor and an image processing apparatus, and thus is equipped with a function to detect the position, the moving speed, and the moving direction of the object 104. Note that the sensor for detecting the position and the movement of the object 104 can be implemented by using a vibration sensor, an infrared sensor, or the like.

The transmitting and receiving antenna 1502 is an antenna installed in the parking lot so as to receive the videos captured by the in-vehicle cameras 1501, and plural units of such antennas may be installed according to the size and the shape of the parking lot.

Each of the in-vehicle cameras 1501 communicates, with a nearby vehicle, the collaboration parameter (u, v) and the target code amount Q of its own, based on the position, the moving speed, and the moving direction of the object 104 detected by the sensor, and forms a distribution pattern of the collaboration parameter having the object 104 as the origin, as shown in FIG. 18. Subsequently, the assignment of code amounts to the respective in-vehicle cameras 1501 is adjusted based on the formed distribution pattern. With this, the target code amount to be assigned to each of the in-vehicle cameras 1501 is adjusted so that the code amount for an in-vehicle camera 1501 that is capturing video of the object becomes larger than the code amounts of the other in-vehicle cameras 1501.

The monitoring camera 1503 is a monitoring camera that is pre-installed in the parking lot.

The monitoring camera 1503 has the same structure as the camera 101 shown in FIG. 5 and can communicate, wiredly or wirelessly, with another monitoring camera 1503 and an in-vehicle camera 1501.

In the monitoring within the parking lot, by capturing videos collaboratively, not only with an in-vehicle camera 1501 but also with a monitoring camera 1053 that is pre-installed in the parking lot, it becomes possible to automatically adjust the assignment of code amounts that involves the assignment to both of the in-vehicle camera 1501 and the monitoring camera 1503.

With this, in the case where only a small number of vehicles are parked in the parking lot, the capturing with the in-vehicle cameras 1501 can be supported with the monitoring camera 1503.

In addition, in the case where a Pan-Tilt-Zoom camera that allows pan, tilt, and zoom controls is installed in the parking lot, and when no in-vehicle camera is present although a larger code amount should be assigned to the place in the distribution of the collaboration parameter (u, v) formed by reciprocal communication between in-vehicle cameras, it is also possible to shift the field of the Pan-Tilt-Zoom camera to a region where no in-vehicle camera is present and cause the camera to monitor.

Thus, the distribution pattern of the collaboration parameter (u, v) may be used not only for assigning code amounts to cameras but also for assigning the video capturing regions for the Pan-Tilt-Zoom camera.

In addition, the distribution pattern of the collaboration parameter (u, v) can also be used for controlling the power of the in-vehicle camera 1501 in the parking lot. For example, it is possible to reduce unnecessary drain on battery power by holding, in a standby mode, an in-vehicle camera 1501 whose values of collaboration parameter (u, v) have not reached a certain level or higher and carrying out video capturing when the values of the collaboration parameter exceed certain values as a result of collaborating operation with a neighboring in-vehicle camera 1501.

Therefore, in the monitoring system according to the present invention, only a camera necessary for capturing video of the object can be automatically selected, and the selected information can be used for controlling the power of each camera.

Thus far, as described in Embodiment 1-1, even when the video adjustment apparatus and the monitoring system according to the present invention are applied in the situation in which the construction of cameras is constantly changed, since the position information for a camera whose position has been changed is newly updated when the structure and arrangement of the monitoring system is changed, the assignment of code amounts to the respective cameras can be automatically adjusted according to the movement of the object 104, as with the case of a monitoring system including fixed cameras.

Figure 19:
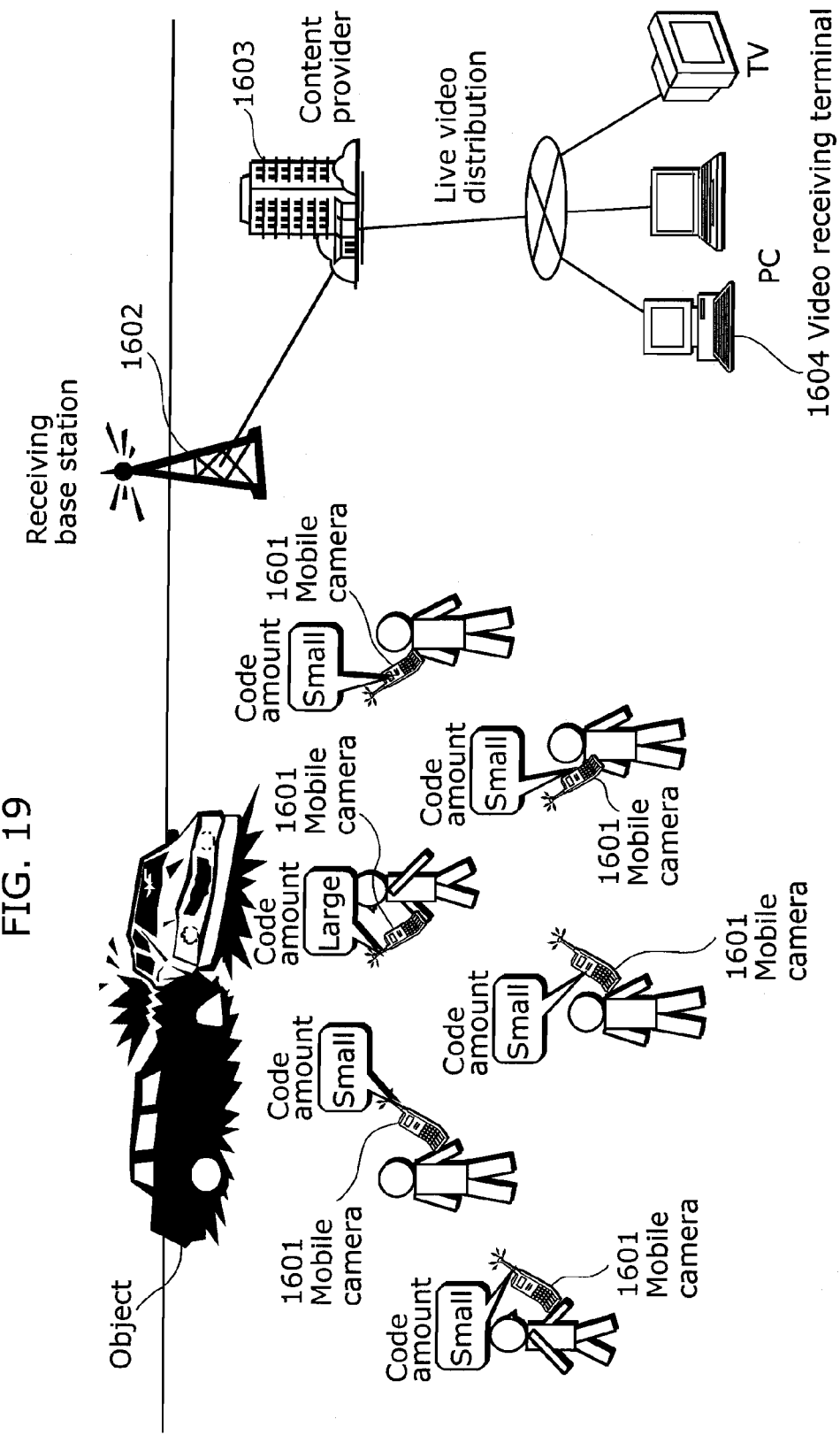
FIG. 19 is a diagram describing Embodiment 1-2 (live video distribution service) in the first embodiment.

FIG. 19 is a diagram showing an example of a service (Embodiment 1-2) in which the plural users each having a mobile camera 1601, such as a camera equipped on a cellular phone, distribute live videos captured with the mobile camera 1601.

As a service for distributing live videos using the mobile camera 1601, various purposes can be given, such as: a real-time relay of a traffic accident or an incident that is encountered by chance, observing behaviors of children and seniors, and reporting of landscapes and events experienced while traveling.

In addition, a live video captured by each of the users with the mobile camera 1601 is transmitted, via a receiving base station 1602, to a service provider such as a content provider 1603 and further distributed by the content provider 1603, in real time, to the PCs and TVs of viewers who wish to watch the live video.

The mobile camera 1601 in FIG. 19 is a camera having the same structure as the camera shown in FIG. 5, and the cellular phone line is used for the communication network for distributing the video.

In addition, each mobile camera 1601 can obtain information on its position according to the position of the receiving base station 1602 that is accessed by a GPS embedded in the cellular phone or cellular phone.

In addition, upon detecting that the user has stayed in the same position for a given length of time, the mobile camera 1601 notifies and exchanges position information with another mobile camera 1601 whose user has also stayed in the same position, and determines a collaboration partner. As a method for determining the collaboration partner, there is a method of selecting, as the collaboration partner, a camera with the distance between mobile cameras 1601 being within a certain range as with the case of the in-vehicle camera 1501.

In the video distribution service shown in FIG. 19, since available transmission bands at the same receiving base station 1602 are limited, it is necessary to efficiently assign the transmission bands to the respective mobile cameras 1601 using the same receiving base station 1602 according to the content that is video-captured by the respective users.

Therefore, in a circumstance where plural users are distributing live videos, for example, the sensor 401 gives an input signal s, which corresponds to the signal given when the object 104 is detected, to the mobile camera 1061 capturing video of an accident such as a traffic accident, and the distribution pattern of the collaboration parameter (u, v) is formed with the spot of accident being the origin, thereby enabling automatic control by which a larger code amount is assigned to the mobile camera of the user who is in the closest position to the spot of accident.

Note that the input signal s for determining what place and what mobile camera 1601 to be preferentially assigned with code amounts may also be spontaneously inputted by the user on his/her own, based on the content of the live video being captured by the user who is distributing the video.

In addition, the content provider 1603 may select the place or the mobile camera 1601 which is distributing a video that might attracts the interests of many viewers, and may give an input signal corresponding to the sensor information with respect to the position or the mobile camera 1601.

Furthermore, what place or what mobile camera 1601 should be assigned with the input signal corresponding to the sensor information may also be determined based on the requests from many viewers.

Thus, by applying the monitoring system and the camera in the monitoring system in the first embodiment of the present invention to the live video distribution service using the mobile camera 1601 or the like, it is possible to select, from among a number of mobile cameras 1601, a mobile camera 1601 whose live video requires preferential distribution based on the requests from the viewers, and further to automatically adjust the assignment of code amounts to respective mobile cameras 1601 in consideration of the transmission band that can be accommodated at the receiving base station 1602.

Second Embodiment

Next, a second embodiment of the present invention shall be described.

In the first embodiment of the present invention, the assignment of code amounts, which takes the movement of the object into consideration, is automatically adjusted by providing difference between the amounts of increase and decrease of the collaboration parameter (u, v) that is reciprocally adjusted between the cameras according to the moving speed and the moving direction of the object.

On the other hand, in the second embodiment, a code amount is preferentially assign to a camera which is capturing video of a region requiring prioritized monitoring by providing difference, with respect to each place to be monitored, and based on the layout of the area to be monitored, between the values of the collaboration parameter (u, v) that are reciprocally adjusted between the cameras.

Figure 20:
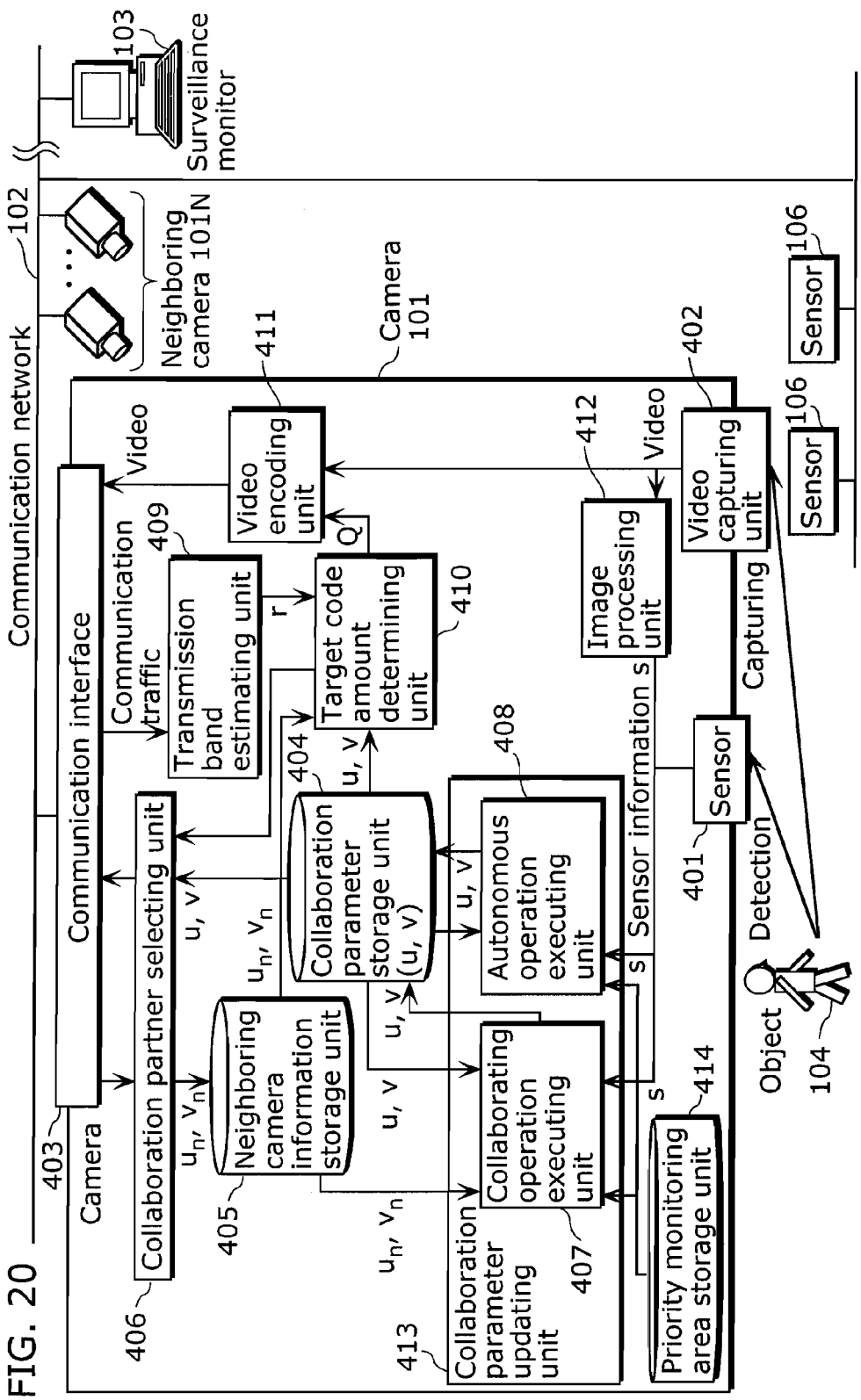
FIG. 20 is a block diagram showing the structure of cameras in the second embodiment.

FIG. 20 is a block diagram showing the structure of the camera 101 in the second embodiment. In FIG. 20, the same numerical references are given to constituent elements that are the same as those in FIG. 5, and their descriptions shall be omitted.

A priority monitoring area storage unit 414 is a memory for storing priority monitoring area information describing, according to the layout of the area to be monitored, the collaboration method for determining the details of the collaboration with a neighboring camera with respect to each place requiring prioritized monitoring.

FIG. 21 is a diagram showing an example of the priority monitoring area information. In the priority monitoring area information, the range of each area and the operation rule for the cameras in the place are defined in the form of reaction-diffusion equations and the values of the coefficients.

In FIG. 21, the range of each area is defined using a latitude-longitude coordinate system; however, other than this, a method of expression which allows a unique specification of the place and the camera, such as specifying the camera number or the like, may also be used.

In addition, FIG. 21 shows an example in which, for a method of collaboration between the cameras in each area, reaction-diffusion equations and the values for the coefficients are directly specified. However, some other collaboration methods are also prepared in advance, and by specifying the number for selecting one of the methods, for example, it is possible to use an expression which allows the specification of the collaboration method with respect to the cameras that are present in each given area. In addition, the collaboration method may also be assigned via a recording medium, such as a communication network, an optical disc, a semiconductor memory, or the like.

The camera 101 compares the installation position of the camera 101 itself and the priority monitoring information stored in the priority monitoring area storage unit 414, and adjusts the method of collaboration with the neighboring camera. Specifically, by checking the position of the camera against the priority monitoring area indicated by the priority monitoring area information, a collaboration parameter updating unit 413 updates the collaboration parameter according to the collaboration method corresponding to the position of the camera.

Figure 22:
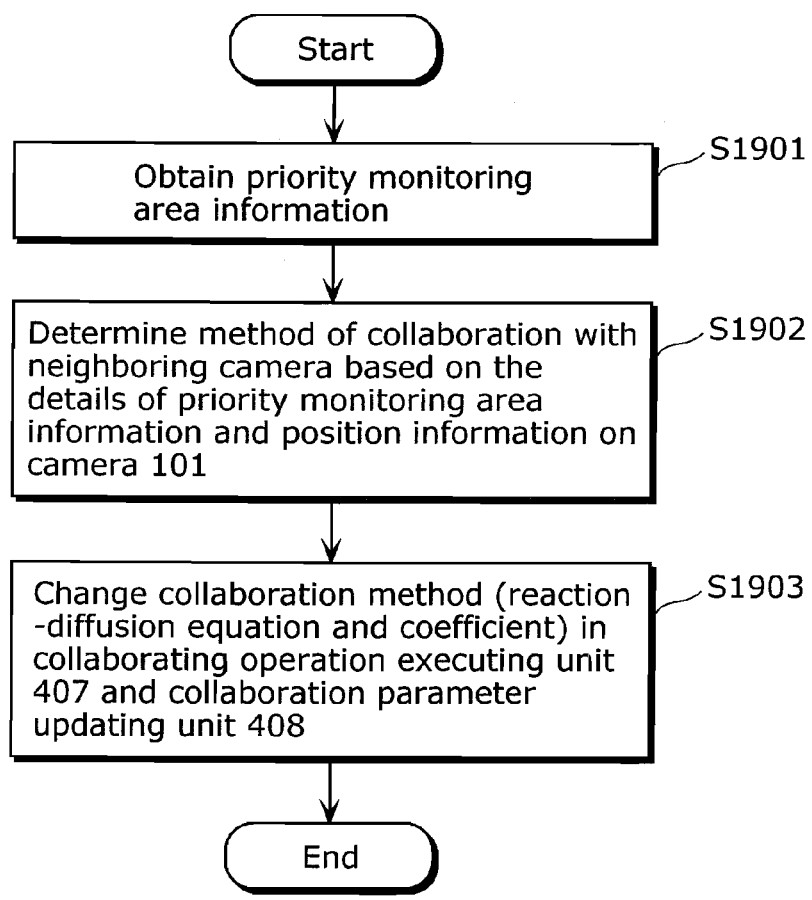
FIG. 22 is a flowchart showing the operation of the camera in the second embodiment.

FIG. 22 is a diagram showing the procedure in which the camera 101 changes the method of collaboration with the neighboring camera 101N.

(Step S1901)

The camera 101 obtains a priority monitoring area 1801 from the priority monitoring area storage unit 414.

(Step S1902)

The camera 101 compares its position information with the acquired priority monitoring area 1801 and determines the method of collaboration with the neighboring camera according to the priority monitoring area 1801.

(Step S1903)

The camera 101 changes the collaboration method (reaction-diffusion equation and coefficient values) that is to be used as the method for collaboration with the neighboring camera in a collaborating operation executing unit 407 and an autonomous operation executing unit 408.

Figure 23:
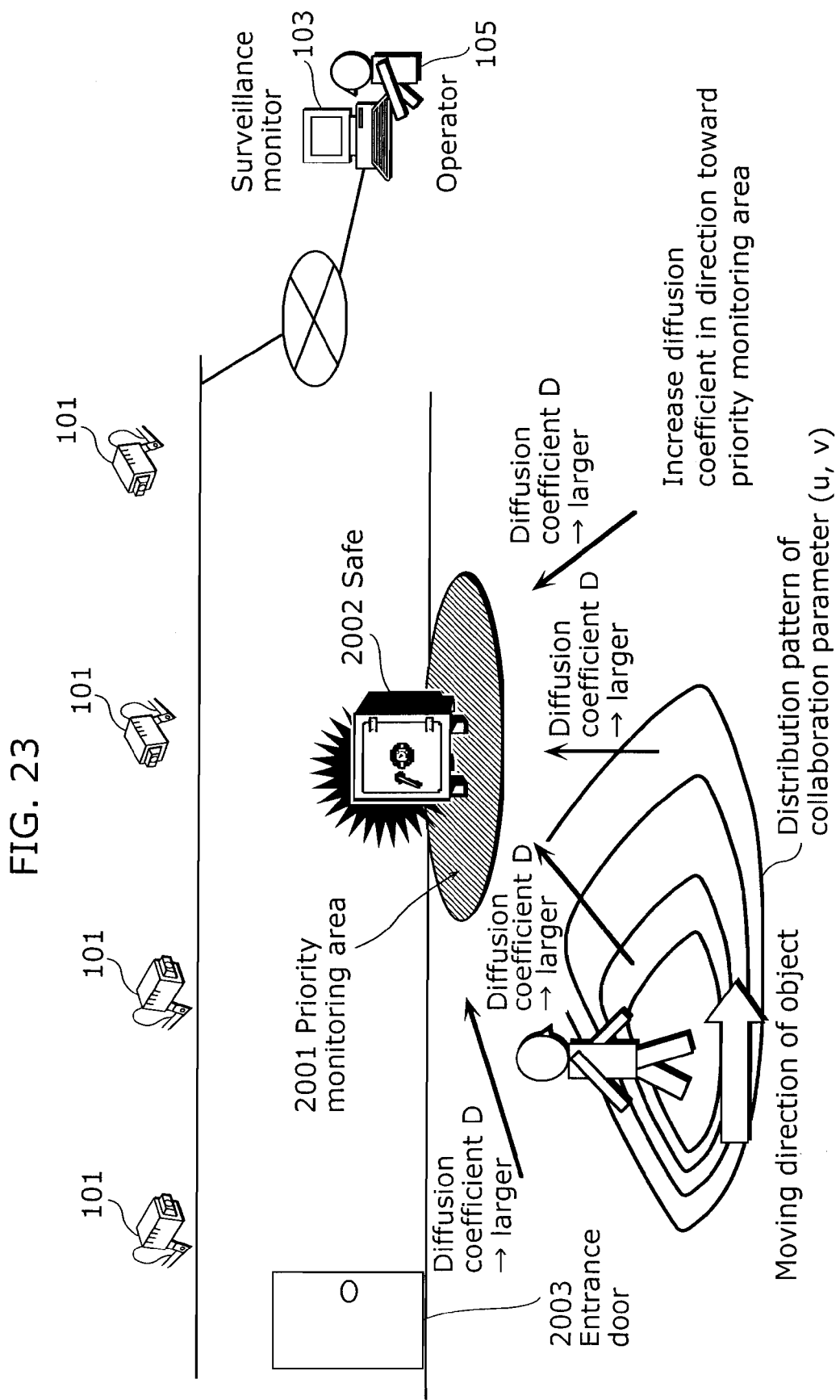
FIG. 23 is a diagram describing Embodiment 2-1 (an example of adjusting the details of collaboration with neighboring cameras) in the second embodiment.

FIG. 23 is a diagram showing Embodiment 2-1 in which the details of the collaboration between each camera 101 and its neighboring camera are adjusted with respect to the position of a priority monitoring area 2001 within the area to be monitored.

FIG. 23 represents a case where: in the area to be monitored, the neighborhood of a place requiring high security, such as a place where a safe is present, is assumed as the priority monitoring area 2001, and the collaboration method of each camera is adjusted so that the diffusion coefficients Du(s) and Dv(s) become larger in the direction of the priority monitoring area 2001, than in any other direction, from respective positions within the area to be monitored. With this, the distribution pattern of the collaboration parameter (u, v) is not only adjusted in the moving direction of the object 104, but the value of the collaboration parameter u is also adjusted larger, from the position where the object 104 is present, in a direction toward the priority monitoring area 2001.

In this manner, with the values of the diffusion coefficients Du(s) and Dv(s) being increased in the direction toward the priority monitoring area 2001, it is possible to automatically assign code amounts not only to increase the code amount for the camera 101 located in a path expected from the movement of the object 104, but also to increase the code amount for the camera in preparation for the movement of the object attempting to approach the priority monitoring area 2001.

In addition, the priority monitoring area 1801 may also be distributed, by an operator 105, from a surveillance monitor 103 to each camera 101, and each camera 101 may automatically update the details of the collaboration based on the distributed information. With this, in the case where the position of the priority monitoring area is changed due to a layout change or the like within the area to be monitored, the details of the collaboration between each camera are adjusted so as to be adapted to the shifted position of the priority monitoring area 2001.

Next, FIG. 24 is a diagram showing Embodiment 2-2 in which the details of the collaboration between each camera 101 and its neighboring camera are adjusted based on the shape of the layout of the area to be monitored.

FIG. 24 is a diagram showing the case where the moving direction (moving path) of the object is restricted due to the shape of the layout of the area to be monitored, such as a corridor corner.

As shown in FIG. 24(*a*), when only the proceeding direction of the object 104 is taken into account for forming the distribution pattern of the collaboration parameter (u, v), a distribution of the collaboration parameter is formed in which a larger code amount is assigned even to a place at which the object 104 cannot actually move forward, such as, as described above, at the corridor corner.

Therefore, as shown in FIG. 24(*b*), for example, by making adjustments so that, at the corridor corner, the values of the diffusion coefficients Du(s) and Dv(s) become larger among the cameras installed in the direction along the corridor, it is possible to assign code amounts automatically in consideration of the moving direction of the subject that is restricted by the layout of the area to be monitored. With this, when the object approaches just before the corner, automatic adjustment becomes possible so as to increase the code amount for the camera located ahead of the corner.

Note that although in the second embodiment the priority monitoring area information is described with an exemplary case where the collaboration method and coefficient values for the cameras are changed with respect to each priority monitoring area 2001, the collaboration method and coefficient values may be changed not only according to the place but also according to the conditions such as the time of the day, the day of the week, the date, and so on.

With this, for example, FIG. 23 assumes a company office or the like where: the surrounding space of a safe 2002 is set as the priority monitoring area 2001 during working hours when people pass by the neighborhood of the safe 2002, and the neighborhood of the entrance door 2003 to the office is set as the priority monitoring area during late night and holiday hours when people leave the office; thereby, in the case where it is known in advance that, late at night or on holidays, there is no one in the office and no one will approach the safe 2002, it is possible to automatically assign code amounts in a more practical manner according to the time of the day.

Thus far, the monitoring system and the camera according to the present invention has been described based on the first and second embodiments. However, the present invention is not limited to these embodiments. Other embodiments achieved by any arbitrary combination of the constituent elements in these embodiments and variations to these embodiments that would occur to those skilled in the art without departing from the spirit of the present invention shall be included in the present invention.

For example, although in the above embodiments, the adjustment of video code amounts in a camera has been described as an exemplary monitoring system in the present invention, the camera in the present invention may also be an apparatus other than a camera or may also have a structure including a video encoding apparatus such as a PC or a video radar which can adjust and distribute the code amount of video data, and, as with the case of the camera, the assignment of code amounts to plural video encoding apparatuses can be automatically adjusted.

In addition, although the descriptions in the first and the second embodiments have been given with an exemplary case where the code amount is adjusted in the encoding process for distributing, in real time, the video captured by the camera. However, this may also be used for adjusting the code amount when the accumulated video data is transcoded and distributed.

For example, as for the code amount for a transcoder, when, at home, video data accumulated on plural recording media, such as hard disk recorders, is transmitted to plural receiving terminals, such as TVs and mobile devices, the distribution pattern of the collaboration parameter (u, v) is formed, based on the topology (the transmission path and the available band) of the network connecting the respective recording media with the receiving terminals, and the performance and the number of the receiving terminals; thereby a monitoring system and a camera, which assigns of a larger code amount to a receiving terminal of higher capacity, without causing any delay or deterioration in video at the respective receiving terminals, can be achieved.

In addition, the descriptions in the first and the second embodiments have been given with an exemplary case where each camera 101 calculates the collaboration parameter (u, v) and the target code amount Q of its own. However, even when the camera 101 calculates the collaboration parameter (u, v) and the target code amount $Q_n$ for another camera 101N and notifies the obtained result to the camera 101N, the same effect can be produced as with the monitoring system and the camera in the monitoring system described in the first and the second embodiments.

In addition, even when a structure is adopted which causes an external apparatus connected via the communication network 102 to calculate the collaboration parameter (u, v) and the value of the target code amount Q for the camera 101, and to notify the result to the camera 101, the same effect is produced as with the case of the monitoring system and the camera in the monitoring system as described in the first and the second embodiments.

In addition, although in the first and the second embodiments, two variables (u, v) are used as variables used for Equation 2, two or more types of variables may be used as long as the method allows the forming of a spatial distribution pattern. In addition, although descriptions have been given using Equations 2 and 3 as an example of forming the spatial pattern of the collaboration parameter, the forming of the spatial distribution pattern may also be performed using another mathematical expression and coefficients. For example, in Equation 3, it is possible to form a more detail spatial distribution pattern by expanding the linear shape which assumes (u, v) as variables into a nonlinear shape.

In addition, the description has been given assuming encoding at a constant bit rate. However, for purposes, such as recording onto a HDD, or the like, that is equipped with each camera, encoding may also be carried out at a variable bit rate.

In addition, in the video capturing with the variable bit rate, the code amount for the video changes significantly according to the movement of the object. Thus, it is also possible to adopt a structure which uses the detection of a code amount equal to or larger than a given value to detect the movement of the object.

INDUSTRIAL APPLICABILITY

The monitoring system and the camera in the monitoring system according to the present invention have a high ability to trace the movement of the object and can automatically assign, to plural cameras, code amounts that allow high utilization efficiency of transmission, irrespective of the number and the type of cameras to be used. Therefore, the monitoring system and the camera in the monitoring system according to the present invention are useful in the anticrime-security field, such as town monitoring in which intruders, passengers, and so on are monitored with plural cameras, a building monitoring system, and a monitoring system for community facilities.

Furthermore, the above monitoring system and the camera in the monitoring system are also applicable as a video distribution system in the area of video distribution services, such as distributing images of an accident or a landscape from an outside location using a mobile camera and the area of ITS and so on, such as parking-lot monitoring using an in-vehicle camera, and as an in-vehicle control system.

The invention claimed is:

1. A monitoring system comprising plural cameras connected through a transmission path,
    wherein each of said plural cameras includes:
    an object detecting unit configured to detect an object that is a moving object to be monitored;
    a video capturing unit configured to capture the object detected by said object detecting unit so as to obtain video;
    a video encoding unit configured to encode the video obtained by said capturing unit;
    a collaboration parameter storage unit for storing a collaboration parameter indicating a relative amount of a target code amount assigned to a camera and a target code amount assigned to a neighboring camera, the target code amount being a target value for video encoding, and said neighboring camera being a predetermined camera, among said plural cameras, that is located near said camera;
    a communication interface unit configured to exchange, by communicating with said neighboring camera, the collaboration parameter stored in said collaboration parameter storage unit of said camera and the target code amount assigned to said camera;
    a neighboring camera information storage unit for storing position identification information for identifying a position of said neighboring camera, as well as the collaboration parameter and the target code amount for said neighboring camera that are obtained by said communication interface unit;
    a collaboration parameter updating unit configured to update the collaboration parameter stored in said collaboration parameter storage unit, based on a position of the object detected by said object detecting unit as well as the position identification information and the collaboration parameter of said neighboring camera that are stored in said neighboring camera information storage unit, so that (i) a distribution pattern, which indicates a distribution of a value of the collaboration parameter in a space in which said plural cameras are present, forms concentric circles having the object detected by said object detecting unit as an origin, and that (ii) the target code amount for a camera capturing the object becomes larger than the target code amount for a camera not capturing the object; and
    a target code amount determining unit configured to determine the target code amount to be assigned to said camera, based on the collaboration parameter updated by said collaboration parameter updating unit as well as the collaboration parameter and the target code amount for said neighboring camera that are stored in said neighboring camera information storage unit, and wherein said video encoding unit is configured to encode the video so that an amount of code generated in the encoding attains the target code amount determined by said target code amount determining unit.

2. The monitoring system according to claim 1,
wherein said target code amount determining unit is configured to specify a curvature of an arc in a region in which said camera is present, in the distribution pattern of the collaboration parameter updated by said collaboration parameter updating unit, and to determine the target code amount so that the target code amount becomes larger as the specified curvature becomes larger.

3. The monitoring system according to claim 2,
wherein said target code amount determining unit, which holds a template that is information defining distances each corresponding to one of plural curvatures of arcs of the distribution pattern, is configured to specify, by referring to the template, a distance according to the curvature of the arc of the region in which said camera is present, and to determine the target code amount so that the target code amount becomes larger as the specified distance becomes smaller, each of the distances being a distance from a corresponding arc to the object.

4. The monitoring system according to claim 1,
wherein said collaboration parameter updating unit is configured to update the collaboration parameter so as to form a distribution pattern of regions having a large collaboration parameter and regions having a small collaboration parameter which are alternately formed, the regions being concentric and having the object as an origin.

5. The monitoring system according to claim 4,
wherein said object detecting unit is configured to detect a moving direction of the object, and
said collaboration parameter updating unit is configured to update the collaboration parameter so as to form a distribution pattern in which intervals at which the regions having the large collaboration parameter and the regions having the small collaboration parameter alternate become larger towards the moving direction of the object.

6. The monitoring system according to claim 5,
wherein said object detecting unit further detects a moving speed of the object, and
said collaboration parameter updating unit is configured to update the collaboration parameter so as to form a distribution pattern in which the intervals at which the regions having the large collaboration parameter and the regions having the small collaboration parameter alternate become larger as the moving speed of the object becomes larger.

7. The monitoring system according to claim 1,
wherein said collaboration parameter updating unit is configured to update the collaboration parameter so that an amount of increase or decrease of the collaboration parameter is in accordance with a reaction-diffusion equation, the amount of increase or decrease being dependent on sensor information which indicates at least one of a presence or absence, a moving speed, and a moving direction of the object.

8. The monitoring system according to claim 7,
wherein in the reaction-diffusion equation, the increase or decrease of the collaboration parameter is represented by a sum of a reaction term and a diffusion term, and said collaboration parameter updating unit includes:
an autonomous operation executing unit configured to update the collaboration parameter so that the collaboration parameter increases or decreases in accordance with the reaction term and a collaboration operation executing unit configured to update the collaboration parameter so that the collaboration parameter increases or decreases in accordance with the diffusion term.

9. The monitoring system according to claim 1,
wherein said communication interface unit is further configured to output, via the transmission path, the video encoded by said video encoding unit, and
said target code amount determining unit is configured to determine a provisional target code amount by substituting a predetermined function with the collaboration parameter updated by said collaboration parameter updating unit as well as the collaboration parameter and the target amount for said neighboring camera that are stored in said neighboring camera information storage unit, to multiply the determined provisional target code amount by a value indicating a free space in a transmission band of the transmission path that can be used by said communication interface unit for outputting the video, and to determine a resulting value as the target code amount to be assigned to said camera.

10. The monitoring system according to claim 1,
wherein said communication interface unit is further configured to obtain an instruction to change the distribution pattern, and
said collaboration parameter updating unit is configured to update the collaboration parameter so that the distribution pattern of the collaboration parameter matches the distribution pattern that has been changed according to the instruction obtained by said communication interface unit.

11. The monitoring system according to claim 1, further comprising
a surveillance monitor which is connected to the transmission path and which displays video,
wherein said communication interface unit is further configured to output, to said surveillance monitor, the video encoded by said video encoding unit, via the transmission path, and
said surveillance monitor receives and decodes encoded videos transmitted from said plural cameras, spatially synthesizes the decoded videos according to the positions of said plural cameras, and displays a resulting synthesized video.

12. The monitoring system according to claim 11,
wherein said surveillance monitor displays the synthesized video so that, from among the videos transmitted from said plural cameras, a video having a large code amount is displayed with pictures of higher quality, larger size, or higher-level gradation.

13. The monitoring system according to claim 11,
wherein said surveillance monitor performs edge enhancement processing on a video having a large code amount, and mosaic processing on a video having a small code amount, from among the videos transmitted from said plural cameras, and displays a synthesized video after each processing.

14. The monitoring system according to claim 1,
wherein each of said plural cameras further includes
a priority monitoring area storage unit which stores priority monitoring area information describing a collaboration method for determining, for each priority monitoring area, details of collaboration with the neighboring camera, the priority monitoring area being a place requiring intensive monitoring according to a layout of an area to be monitored, and said collaboration parameter updating unit is further configured to update the collaboration parameter according to the collaboration method corresponding to the position of said camera, by checking the position of said camera against the priority monitoring area indicated by the priority monitoring area information.

15. The monitoring system according to claim 1, wherein said object detecting unit is configured to detect an abnormal point in a monitoring target as the object.

16. A video encoding method used in a camera in a monitoring system including plural cameras connected through a transmission path, wherein each of said plural cameras includes:

an object detecting unit configured to detect an object that is a moving object to be monitored;

a video capturing unit configured to capture the object detected by said object detecting unit so as to obtain video;

a video encoding unit configured to encode the video obtained by said video capturing unit;

a collaboration parameter storage unit for storing a collaboration parameter indicating a relative amount of a target code amount assigned to a camera and a target code amount assigned to a neighboring camera, the target code amount being a target value in video encoding, and said neighboring camera being a predetermined camera, among said plural cameras, that is located near said camera;

a communication interface unit configured to exchange, by communicating with the neighboring camera, the collaboration parameter stored in said collaboration parameter storage unit of said camera and the target code amount assigned to said camera; and a neighboring camera information storage unit for storing position identification information for identifying a position of said neighboring camera, as well as the collaboration parameter and the target code amount for said neighboring camera that are obtained by said communication interface unit, and wherein said video encoding method includes:

a collaboration parameter updating step of updating the collaboration parameter stored in said collaboration parameter storage unit, based on a position of the object detected by said object detecting unit as well as the position identification information and the collaboration parameter of said neighboring camera that are stored in said neighboring camera positioning information unit so that: (i) a distribution pattern, which indicates a distribution of a value of the collaboration parameter in a space in which said plural cameras are present, forms concentric circles having the object detected by said object detecting unit as an origin, and that (ii) the target code amount for a camera capturing the object becomes larger than the target code amount for a camera not capturing the object;

a target code amount determining step of determining the target code amount to be assigned to said camera, based on the collaboration parameter updated in said collaboration parameter updating step as well as the collaboration parameter and the target code amount for said neighboring camera that are stored in said neighboring camera information storage unit; and a video encoding step of encoding the video so that an amount of code generated in the encoding attains the target code amount determined in said target code amount determining step.

17. A program, stored in a non-transitory computer readable medium, which is executed in a camera in a monitoring system including plural cameras connected through a transmission path, said program causing a computer included in the camera to execute the steps included in the video encoding method according to claim 16.

* * * * *